(12) United States Patent
Tsuchida et al.

(10) Patent No.: US 11,791,853 B2
(45) Date of Patent: Oct. 17, 2023

(54) RADIO-FREQUENCY MODULE AND COMMUNICATION APPARATUS

(71) Applicant: Murata Manufacturing Co., Ltd., Nagaokakyo (JP)

(72) Inventors: Shigeru Tsuchida, Nagaokakyo (JP); Hiroki Shonai, Nagaokakyo (JP); Masakazu Tani, Nagaokakyo (JP); Yukiya Yamaguchi, Nagaokakyo (JP); Morio Takeuchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/376,167

(22) Filed: Jul. 15, 2021

(65) Prior Publication Data

US 2022/0021407 A1   Jan. 20, 2022

(30) Foreign Application Priority Data

Jul. 16, 2020  (JP) .................................. 2020-122416

(51) Int. Cl.
*H04B 1/04*   (2006.01)
*H04B 1/16*   (2006.01)

(52) U.S. Cl.
CPC ......... *H04B 1/0458* (2013.01); *H04B 1/0483* (2013.01); *H04B 1/1615* (2013.01)

(58) Field of Classification Search
CPC .............. H03F 2200/451; H03F 3/245; H03F 2200/294; H03F 3/195; H03F 3/72; H03F 2200/111; H03F 2203/7209; H03F 1/565; H03F 2200/222; H03F 2200/387; H03F 1/56; H03F 3/19; H03F 3/211; H03F 2200/171; H03F 3/24; H03F 1/3205; H03F 3/68; H03F 2200/534; H03F 2200/537; H03F 3/213; H03F 1/32; H03F 2200/541; H04B 1/006; H04B 1/0458; H04B 2001/0408; H04B 1/0057; H04B 1/40; H04B 1/04; H04B 1/18; H04B 1/44; H04B 1/0475; H04B 1/525; H04B 1/0483; H04B 1/48; H04B 1/38; H04B 1/0064; H04B 1/0078; H04B 2001/0416; H04B 1/03; H04B 1/0067; H04B 1/16; H04B 1/00; H04B 1/1615; H04B 1/401;
(Continued)

(56) References Cited

U.S. PATENT DOCUMENTS

2006/0160503 A1* 7/2006 Ichitsubo ................ H03F 3/195
                                                              455/127.1
2016/0006415 A1* 1/2016 Takematsu ............. H03H 11/04
                                                              333/126

* cited by examiner

*Primary Examiner* — Golam Sorowar
(74) *Attorney, Agent, or Firm* — XSENSUS LLP

(57) ABSTRACT

A radio-frequency module includes a mounting substrate having a first main surface; a first power amplifier that is mounted on the first main surface and that amplifies a first transmission signal in a first frequency band; a second power amplifier that is mounted on the first main surface and that amplifies a second transmission signal in a second frequency band different from the first frequency band; a first output matching circuit that is mounted on the first main surface and that receives the first transmission signal amplified by the first power amplifier; and a second output matching circuit that is mounted on the first main surface and that receives the second transmission signal amplified by the second power amplifier. The first output matching circuit and the second output matching circuit are mounted along a second direction intersecting with the first direction.

20 Claims, 7 Drawing Sheets

(58) Field of Classification Search
CPC .... H04B 2001/485; H01L 2224/16225; H01L 23/66; H01L 23/5383; H01L 24/16; H01L 2924/181; H01L 2924/19105; H01L 2223/6677; H01L 2223/6655; H01L 23/49811; H01L 2924/00; H01L 2924/00012; H01L 23/552; H01L 23/49816; H01L 2924/00014; H01L 2924/15311; H01L 2224/16235; H01L 2224/48227; H01L 2224/16227; H01L 24/13; H01Q 1/2283; H01Q 1/38; H01Q 9/0407; H01Q 21/28; H01Q 1/243; H01Q 21/065; H01Q 9/0414; H01Q 21/08; H01Q 25/00; H01Q 21/0025; H01Q 23/00; H01Q 3/24; H01Q 3/26; H01Q 3/30; H01Q 5/35; H01Q 9/42; H01Q 1/523; H01Q 1/526; H01Q 21/24; H01Q 1/085; H01Q 21/062; H01Q 21/067; H01Q 21/245; H01Q 25/001
See application file for complete search history.

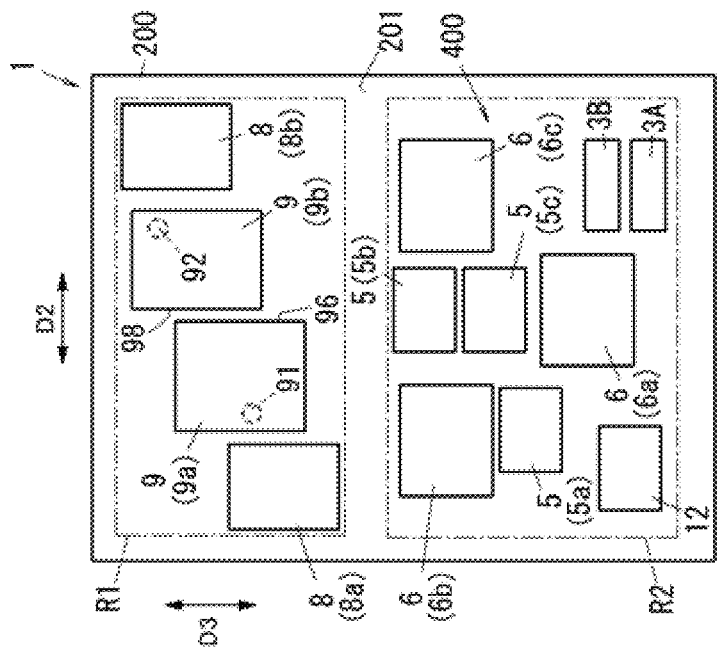
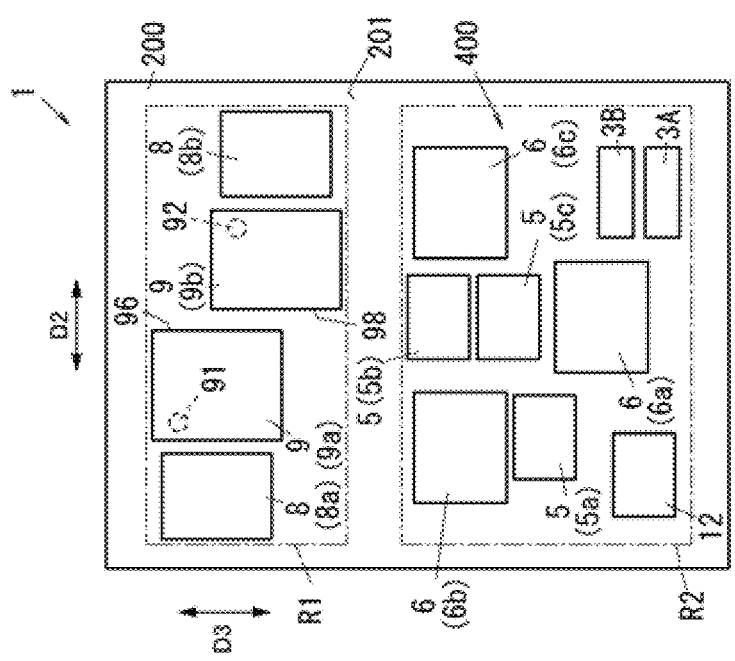

RADIO-FREQUENCY MODULE AND COMMUNICATION APPARATUS

CROSS-REFERENCE TO RELATED APPLICATION

The present application is based on and claims priority to Japanese Patent Application No. 2020-122416, filed on Jul. 16, 2020. The entire contents of which being incorporated herein by reference.

TECHNICAL FIELD

The present disclosure generally relates to radio-frequency modules and communication apparatuses. More particularly, the present disclosure relates to a radio-frequency module and a communication apparatus, which transmit signals.

BACKGROUND

Conventionally, communication apparatuses capable of a carrier aggregation operation using at least two frequency bands have hitherto been known. For example, a conventional communication apparatus includes two radio-frequency (RF) modules having the same configuration. Among the two RF modules, one RF module processes radio-frequency signals in a frequency band belonging to a first band group and the other RF module processes radio-frequency signals in a frequency band belonging to a second band group having frequencies higher than those of the first band group.

SUMMARY

A radio-frequency module according to the present disclosure includes a mounting substrate having a first main surface, a thickness of the mounting substrate along a first direction; a first power amplifier that is mounted on the first main surface and that amplifies a first transmission signal in a first frequency band; a second power amplifier that is mounted on the first main surface and that amplifies a second transmission signal in a second frequency band different from the first frequency band; a first output matching circuit that is mounted on the first main surface and that receives the first transmission signal amplified by the first power amplifier; and a second output matching circuit that is mounted on the first main surface and that receives the second transmission signal amplified by the second power amplifier. The first output matching circuit and the second output matching circuit are mounted along a second direction intersecting with the first direction. When the mounting substrate is viewed from a third direction intersecting both the first direction and the second direction, the first power amplifier and the first output matching circuit line up with each other and the second power amplifier and the second output matching circuit line up with each other. When the mounting substrate is viewed from the third direction, the first power amplifier and the second power amplifier are between the first output matching circuit and the second output matching circuit.

Other features, elements, characteristics and advantages of the present disclosure will become more apparent from the following detailed description of embodiments of the present disclosure with reference to the attached drawings.

BRIEF DESCRIPTION OF THE DRAWINGS

FIG. 4A is a plan view for describing an example of the arrangement of multiple circuit components on a substrate of a radio-frequency module according to a first modification of the embodiment;

FIG. 4B is a plan view for describing an example of the arrangement of multiple circuit components on a substrate of a radio-frequency module according to a second modification of the embodiment;

DETAILED DESCRIPTION OF THE DRAWINGS

Figure 1:
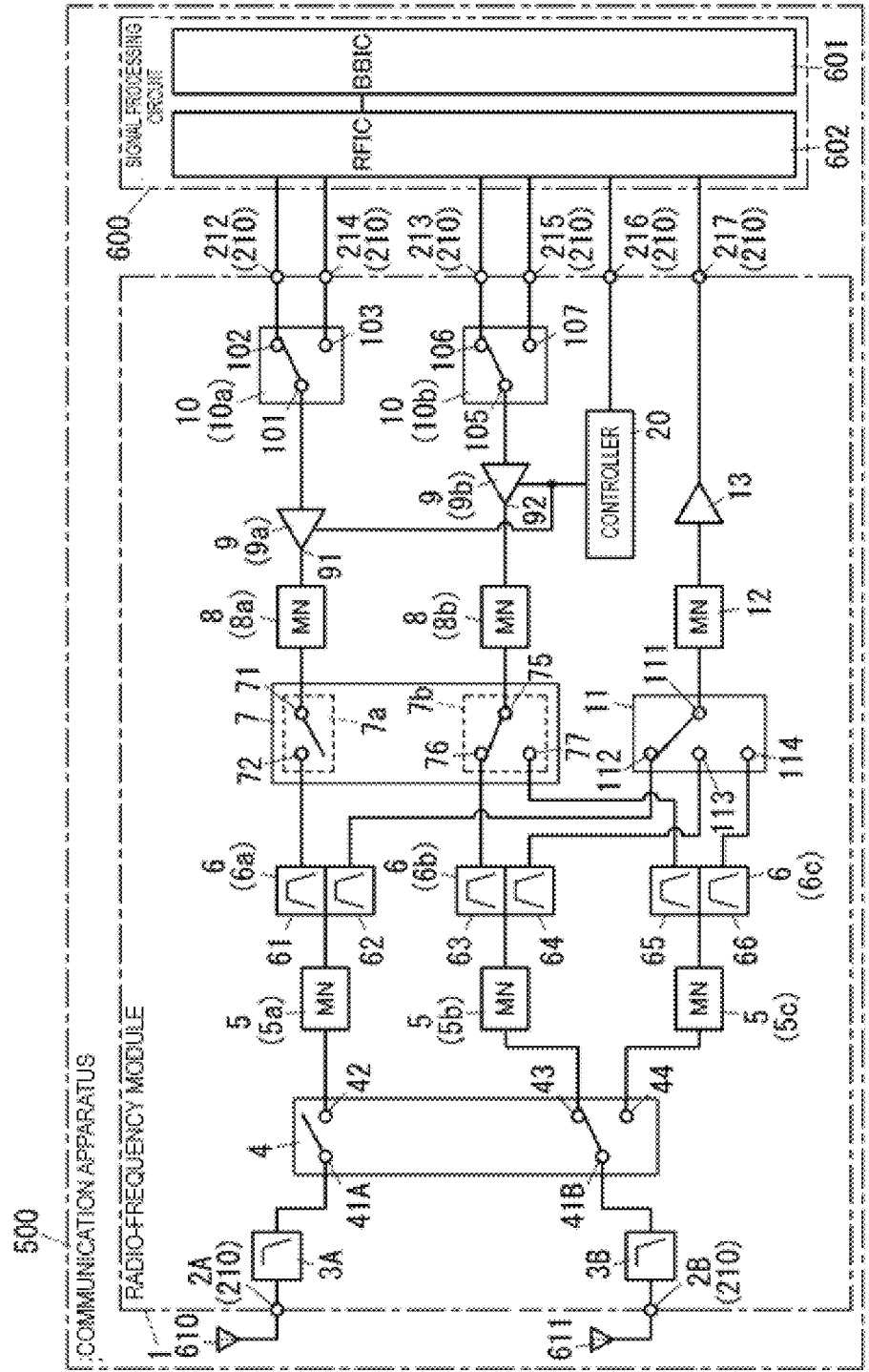
FIG. 1 is a circuit diagram for describing the configuration of a radio-frequency module and a communication apparatus according to an embodiment.

The inventors of the present disclosure have identified that there is a problem with conventional communication apparatuses in that isolation is reduced when transmission signals in different frequency bands are transmitted through simultaneous communication using one radio-frequency module.

In order to resolve the above problem, the inventors have developed the technology of the present disclosure, which provides a radio-frequency module and a communication apparatus, which suppresses reduction in isolation when signals in different frequency bands are transmitted through the simultaneous communication.

A radio-frequency module according to the present disclosure includes a mounting substrate having a first main surface, a first power amplifier, a second power amplifier, a first output matching circuit, and a second output matching circuit. The first power amplifier is mounted on the first main surface and amplifies a first transmission signal in a first frequency band. The second power amplifier is mounted on the first main surface and amplifies a second transmission signal in a second frequency band different from the first frequency band. The second transmission signal is capable of being simultaneously communicated with the first transmission signal. The first output matching circuit is mounted on the first main surface and receives the first transmission signal amplified by the first power amplifier. The second output matching circuit is mounted on the first main surface and receives the second transmission signal amplified by the second power amplifier.

The first output matching circuit and the second output matching circuit are mounted along a second direction intersecting with a thickness direction of the mounting substrate, which is a first direction. When the mounting substrate is viewed from a third direction intersecting with both the first direction and the second direction, the first power amplifier and the first output matching circuit are mounted so as to be lined up with each other and the second power amplifier and the second output matching circuit are mounted so as to be lined up with each other. When the mounting substrate is viewed from the third direction, the first power amplifier and the second power amplifier are mounted between the first output matching circuit and the second output matching circuit.

A communication apparatus according to the present disclosure further includes the radio-frequency module and a signal processing circuit that processes the first transmission signal and the second transmission signal passing through the radio-frequency module.

Hereinafter, embodiments of the present disclosure will be described in detail. Note that the embodiments described below illustrate general or specific examples. The numerical values, shapes, materials, constituent elements, the arrangement and connection of the constituent elements, etc., illustrated in the following embodiments, working examples, and variations are mere examples, and are therefore not intended to limit the present disclosure. Among the constituent elements in the following working examples and variations, constituent elements not recited in the independent claims will be described as optional constituent elements. In addition, the size of the constituent elements and the ratio of the size illustrated in the drawings are not necessarily precise. In the drawings, essentially the same constituent elements share the same reference signs, and redundant descriptions will be omitted or simplified.

FIGS. 2A and 2B to FIG. 8 are schematic drawings and the ratios of the sizes and the thicknesses of the respective components in the drawings do not necessarily reflect actual dimensional ratios.

A radio-frequency module 1 and a communication apparatus 500 including the radio-frequency module 1 according to an embodiment will now be described with reference to FIG. 1 to FIG. 3.

(1) Radio-Frequency Module

As illustrated in FIG. 1, the radio-frequency module 1 according to the present embodiment includes multiple (two in the example in FIG. 1) antenna terminals 2A and 2B, multiple (two in the example in FIG. 1) low pass filters 3A and 3B, a first switch 4, multiple (three in the example in FIG. 1) matching circuits 5, and multiple (three in the example in FIG. 1) filters 6. The radio-frequency module 1 further includes a second switch 7, multiple (two in the example in FIG. 1) output matching circuits 8, multiple (two in the example in FIG. 1) power amplifiers 9, and multiple (two in the example in FIG. 1) third switches 10. The radio-frequency module 1 further includes a fourth switch 11, an input matching circuit 12, a low noise amplifier 13, and a controller 20.

The radio-frequency module 1 according to the present embodiment is used in, for example, the multimode-multiband communication apparatus 500. Although the communication apparatus 500 is, for example, a mobile phone (for example, a smartphone), the communication apparatus 500 is not limited to the mobile phone. The communication apparatus 500 may be, for example, a wearable terminal (for example, a smart watch). The radio-frequency module 1 is, for example, a module supporting the 4th Generation Mobile Communication (4G) standard, the 5th Generation Mobile Communication (5G) standard, and so on. The 4G standard is, for example, Third Generation Partnership Project (3GPP) Long Term Evolution (LTE) standard. The 5G standard is, for example, 5G New Radio (NR). The radio-frequency module 1 is a module supporting carrier aggregation and dual connectivity. The carrier aggregation and the dual connectivity mean communication simultaneously using radio waves in multiple frequency bands.

Specifically, the radio-frequency module 1 according to the present embodiment simultaneously performs communication of signals in a frequency band defined in the 4G and communication of signals in another frequency band defined in the 4G. The radio-frequency module 1 simultaneously performs communication of signals in a frequency band defined in the 4G and communication of signals in a frequency band defined in the 5G. The radio-frequency module 1 simultaneously performs communication of signals in a frequency band defined in the 5G and communication of signals in another frequency band defined in the 5G. The communication using the carrier aggregation and the dual connectivity is hereinafter also referred to as simultaneous communication.

The radio-frequency module 1 according to the present embodiment performs communication in a high-band frequency band and communication in a mid-band frequency band. In the present embodiment, for example, Band41 (having a frequency band from about 2,496 MHz to about 2,690 MHz) is used as the high-band frequency band defined in the 4G and, for example, Band1 (having a frequency band from about 1,920 MHz to about 1,980 MHz) is used as the mid-band frequency band defined in the 4G. For example, n41 (having a frequency band from about 2,496 MHz to about 2,690 MHz) is used as the high-band frequency band defined in the 5G and, for example, n1 (having a frequency band from about 1,920 MHz to about 1,980 MHz) is used as the mid-band frequency band defined in the 5G. Band41 and n41 are used in time division duplex (TDD) communication. Band1 and n1 are used in frequency division duplex (FDD) communication. For example, Band40 may be used as the high-band frequency band defined in the 4G. For example, Band3, Band2, Band25, Band4, Band66, Band39, or Band34 may be used as the mid-band frequency band defined in the 4G. For example, n3 may be used as the mid-band frequency band defined in the 5G.

When it is necessary to discriminate the multiple matching circuits 5 in the following description, the three matching circuits 5 are described as a first matching circuit 5a, a second matching circuit 5b, and a third matching circuit 5c. When it is necessary to discriminate the multiple filters 6 in the following description, the three filters 6 are described as a first filter 6a, a second filter 6b, and a third filter 6c. When it is necessary to discriminate the multiple output matching circuits 8 in the following description, the two output matching circuits 8 are described as a first output matching circuit 8a and a second output matching circuit 8b. When it is necessary to discriminate the multiple power amplifiers 9 in the following description, the two power amplifiers 9 are described as a first power amplifier 9a and a second power amplifier 9b. When it is necessary to discriminate the multiple third switches 10 in the following description, the two third switches 10 are described as a high-band third switch 10a and a mid-band third switch 10b.

(2) Components in Radio-Frequency Module

The respective components in the radio-frequency module 1 according to the present embodiment will now be described with reference to FIG. 1.

As described above, the radio-frequency module 1 includes the multiple (two in the example in FIG. 1) antenna terminals 2A and 2B, the multiple (two in the example in FIG. 1) low pass filters 3A and 3B, the first switch 4, the multiple (three in the example in FIG. 1) matching circuits 5, and the multiple (three in the example in FIG. 1) filters 6. The radio-frequency module 1 further includes the second switch 7, the multiple (two in the example in FIG. 1) output matching circuits 8, the multiple (two in the example in FIG. 1) power amplifiers 9, and the multiple (two in the example in FIG. 1) third switches 10. The radio-frequency module 1 further includes the fourth switch 11, the input matching circuit 12, the low noise amplifier 13, and the controller 20.

The radio-frequency module 1 has multiple (two in the example in FIG. 1) first signal input terminals 212 and 214, multiple (two in the example in FIG. 1) second signal input terminals 213 and 215, a control terminal 216, and a signal output terminal 217. The first signal input terminals 212 and 214 are electrically connected to an input terminal of the first power amplifier 9a. The second signal input terminals 213 and 215 are electrically connected to an input terminal of the second power amplifier 9b. The control terminal 216 is electrically connected to the controller 20. The signal output terminal 217 is connected to an output terminal of the low noise amplifier 13.

The antenna terminal 2A is electrically connected to an antenna 610, as illustrated in FIG. 1. The antenna terminal 2B is electrically connected to an antenna 611, as illustrated in FIG. 1.

One end of the low pass filter 3A is connected to the antenna terminal 2A and the other end thereof is connected to the first switch 4. The low pass filter 3A transmits a reception signal received by the antenna 610. In other words, the reception signal received by the antenna 610 is supplied to the low pass filter 3A through the antenna terminal 2A. The reception signal from which frequencies higher than a predetermined frequency are attenuated is output from the low pass filter 3A. The low pass filter 3A transmits a transmission signal to be transmitted through the antenna 610. In other words, the transmission signal is supplied to the low pass filter 3A through the first switch 4. The transmission signal from which frequencies higher than a predetermined frequency are attenuated is output from the low pass filter 3A. The transmission signal is transmitted from the antenna 610 through the antenna terminal 2A. In the present embodiment, the low pass filter 3A transmits the transmission signal and the reception signal in the high-band frequency band.

One end of the low pass filter 3B is connected to the antenna terminal 2B and the other end thereof is connected to the first switch 4. The low pass filter 3B transmits a reception signal received by the antenna 611. In other words, the reception signal received by the antenna 611 is supplied to the low pass filter 3B through the antenna terminal 2B. The reception signal from which frequencies higher than a predetermined frequency are attenuated is output from the low pass filter 3B. The low pass filter 3B transmits a transmission signal to be transmitted through the antenna 611. In other words, the transmission signal is supplied to the low pass filter 3B through the first switch 4. The transmission signal from which frequencies higher than a predetermined frequency are attenuated is output from the low pass filter 3B. The transmission signal is transmitted from the antenna 611 through the antenna terminal 2B. In the present embodiment, the low pass filter 3B transmits the transmission signal and the reception signal in the mid-band frequency band. In other words, the low pass filter 3B transmits the signal of a frequency lower than the frequency of the signal which the low pass filter 3A transmits.

The first switch 4 is a switch that switches the destinations to be connected to the antenna terminals 2A and 2B (that is, the antennas 610 and 611). As illustrated in FIG. 1, the first switch 4 has multiple (two in the example in FIG. 1) common terminals 41A and 41B and multiple (three in the example in FIG. 1) selection terminals 42, 43, and 44. The first switch 4 selects the selection terminal 42 as the destination to which the common terminal 41A is connected. The first switch 4 selects at least one of the selection terminals 43 and 44 as the destination to which the common terminal 41B is connected. The common terminal 41A is electrically connected to the antenna terminal 2A. The common terminal 41B is electrically connected to the antenna terminal 2B. Specifically, the common terminal 41A is electrically connected to the antenna 610 via the antenna terminal 2A and the common terminal 41B is electrically connected to the antenna 611 via the antenna terminal 2B. The common terminal 41A may be directly connected to the antenna 610. Similarly, the common terminal 41B may be directly connected to the antenna 611. The selection terminal 42 is electrically connected to the first matching circuit 5a. The selection terminal 43 is electrically connected to the second matching circuit 5b. The selection terminal 44 is electrically connected to the third matching circuit 5c. The first switch 4 is configured so as to simultaneously perform the connection between the antenna terminal 2A and the first matching circuit 5a and the connection between the antenna terminal 2B and the second matching circuit 5b under the control of a signal processing circuit 600.

The multiple filters 6 are, for example, acoustic wave filters and each include multiple series arm resonators and multiple parallel arm resonators, each of which is composed of an acoustic wave resonator. The acoustic wave filter is, for example, a surface acoustic wave (SAW) filter using surface acoustic waves. The multiple filters 6 are not limited to the SAW filters. The multiple filters 6 may be, for example, bulk acoustic wave (BAW) filters, other than the SAW filters. Alternatively, the multiple filters 6 may be composed of film bulk acoustic resonators (FBARs) or the likes. In addition, the multiple filters 6 may be composed of LC resonant circuits or the likes.

The multiple filters 6 are duplexers. Each of the filters 6 is electrically connected to one of the multiple selection terminals of the first switch 4 in one-to-one correspondence. The first filter 6a includes two filters (a first transmission filter 61 and a first reception filter 62). The second filter 6b includes two filters (a second transmission filter 63 and a second reception filter 64). The third filter 6c includes two filters (a third transmission filter 65 and a third reception filter 66). The first transmission filter 61 is electrically connected to the first output matching circuit 8a via the second switch 7. The second transmission filter 63 and the third transmission filter 65 are electrically connected to the second output matching circuit 8b via the second switch 7. The first reception filter 62, the second reception filter 64, and the third reception filter 66 are electrically connected to the input matching circuit 12 via the fourth switch 11.

The first transmission filter 61 transmits, for example, the high-band transmission signal. The second transmission filter 63 transmits, for example, the mid-band transmission signal conforming to the 5G standard. The third transmission filter 65 transmits, for example, the mid-band transmission signal conforming to the 4G standard. The first reception filter 62 transmits, for example, the high-band reception signal. The second reception filter 64 transmits, for example, the mid-band reception signal conforming to the 5G standard. The third reception filter 66 transmits, for example, the mid-band reception signal conforming to the 4G standard.

The second switch 7 includes a high-band second switch 7a and a mid-band second switch 7b.

The high-band second switch 7a has a common terminal 71 and a selection terminal 72. The selection terminal 72 is electrically connected to the first transmission filter 61. The high-band second switch 7a selects the selection terminal 72 as the destination to which the common terminal 71 is connected. The high-band second switch 7a connects the selection terminal 72 to the common terminal 71 in the communication in the high-band frequency band, for example, under the control of the signal processing circuit 600.

The mid-band second switch 7b switches between a transmission path of the transmission signal conforming the 5G standard and a transmission path of the transmission signal conforming to the 4G standard in the communication in the mid-band frequency band. The mid-band second switch 7b has a common terminal 75 and multiple (two in the example in FIG. 1) selection terminals 76 and 77. The selection terminal 76 is electrically connected to the second transmission filter 63. The selection terminal 77 is electrically connected to the third transmission filter 65. The mid-band second switch 7b switches between the selection terminal 76 and the selection terminal 77 as the destination to which the common terminal 75 is connected in the communication in the mid-band frequency band. The mid-band second switch 7b switches the destination to which the common terminal 75 is connected between the selection terminal 76 and the selection terminal 77, for example, under the control of the signal processing circuit 600. The selection terminal 76 is selected in the mid-band communication conforming to the 5G standard and the selection terminal 77 is selected in the mid-band communication conforming to the 4G standard.

Each of the multiple output matching circuits 8 (the first output matching circuit 8a and the second output matching circuit 8b) performs impedance matching between the power amplifier 9 and the corresponding transmission filter, among the first transmission filter 61, the second transmission filter 63, and the third transmission filter 65. Although each of the multiple output matching circuits 8 is composed of, for example, one inductor, each of the multiple output matching circuits 8 is not limited to the inductor. Each of the multiple output matching circuits 8 may include, for example, multiple inductors and multiple capacitors. Each of the multiple output matching circuits 8 may include a transformer.

An input terminal of the first output matching circuit 8a is electrically connected to the first power amplifier 9a and an output terminal of the first output matching circuit 8a is electrically connected to the common terminal 71 of the high-band second switch 7a. The first output matching circuit 8a performs the impedance matching between the first power amplifier 9a and the first transmission filter 61.

An input terminal of the second output matching circuit 8b is electrically connected to the second power amplifier 9b and an output terminal of the second output matching circuit 8b is electrically connected to the common terminal 75 of the mid-band second switch 7b. The second output matching circuit 8b performs the impedance matching between the second power amplifier 9b and the second transmission filter 63 and the third transmission filter 65.

The multiple power amplifiers 9 (the first power amplifier 9a and the second power amplifier 9b) each amplify the transmission signal.

The input terminal of the first power amplifier 9a is electrically connected to the signal processing circuit 600 via the high-band third switch 10a. An output terminal 91 (hereinafter referred to as a first output terminal 91) of the first power amplifier 9a is connected to the first output matching circuit 8a. Specifically, the first power amplifier 9a amplifies the transmission signal (a first transmission signal) in the high-band (a first frequency band) output from the signal processing circuit 600. The first power amplifier 9a supplies the amplified first transmission signal to the first output matching circuit 8a. In other words, the transmission signal amplified by the first power amplifier 9a is input into the first output matching circuit 8a.

The input terminal of the second power amplifier 9b is electrically connected to the signal processing circuit 600 via the mid-band third switch 10b. An output terminal 92 (hereinafter referred to as a second output terminal 92) of the second power amplifier 9b is connected to the second output matching circuit 8b. Specifically, the second power amplifier 9b amplifies the transmission signal (a second transmission signal) in the mid-band (a second frequency band) output from the signal processing circuit 600. The second power amplifier 9b amplifies the transmission signal (the second transmission signal) in the mid-band, which is simultaneously communicated with the first transmission signal, through the simultaneous communication and supplies the amplified second transmission signal to the second output matching circuit 8b. Specifically, the second power amplifier 9b amplifies the second transmission signal, which is capable of being simultaneously communicated with the first transmission signal and which is in the second frequency band different from the first frequency band. In other words, the transmission signal amplified by the second power amplifier 9b is input into the second output matching circuit 8b. The second frequency band is lower than the first frequency band.

Each of the third switches 10 switches the transmission signal to be transmitted, that is, switches between the transmission signal conforming to the 4G standard and the transmission signal conforming to the 5G standard.

The high-band third switch 10a has a common terminal 101 and multiple (two in the example in FIG. 1) selection terminals 102 and 103. The common terminal 101 is connected to the input terminal of the first power amplifier 9a. The selection terminal 102 is connected to the first signal input terminal 212, among the multiple (two here) first signal input terminals 212 and 214. Specifically, the selection terminal 102 is electrically connected to the signal processing circuit 600 via the first signal input terminal 212. The selection terminal 103 is connected to the first signal input terminal 214, among the multiple (two here) first signal input terminals 212 and 214. Specifically, the selection terminal 103 is electrically connected to the signal processing circuit 600 via the first signal input terminal 214. The high-band third switch 10a switches the destination to which the common terminal 101 is connected between the selection terminal 102 and the selection terminal 103 under the control of the signal processing circuit 600. The selection terminal 102 is selected in the high-band communication conforming to the 5G standard and the selection terminal 103 is selected in the high-band communication conforming to the 4G standard.

The mid-band third switch 10b has a common terminal 105 and multiple (two in the example in FIG. 1) selection terminals 106 and 107. The common terminal 105 is electrically connected to the input terminal of the second power amplifier 9b. The selection terminal 106 is connected to the second signal input terminal 213, among the multiple (two here) second signal input terminals 213 and 215. Specifically, the selection terminal 106 is electrically connected to the signal processing circuit 600 via the second signal input terminal 213. The selection terminal 107 is connected to the second signal input terminal 215, among the multiple (two here) second signal input terminals 213 and 215. Specifically, the selection terminal 107 is electrically connected to the signal processing circuit 600 via the second signal input terminal 215. The mid-band third switch 10b switches the destination to which the common terminal 105 is connected between the selection terminal 106 and the selection terminal 107 under the control of the signal processing circuit 600. The selection terminal 106 is selected in the mid-band communication conforming to the 5G standard and the selection terminal 107 is selected in the mid-band communication conforming to the 4G standard.

The fourth switch 11 switches a reception path of the reception signal. The fourth switch 11 has a common terminal 111 and multiple (three in the example in FIG. 1) selection terminals 112, 113, and 114. The selection terminal 112 is electrically connected to the first reception filter 62. The selection terminal 113 is electrically connected to the second reception filter 64. The selection terminal 114 is electrically connected to the third reception filter 66. The fourth switch 11 switches the destination to which the common terminal 111 is connected between the selection terminals 112, 113, and 114 under the control of the signal processing circuit 600. The selection terminal 112 is selected in the high-band communication, the selection terminal 113 is selected in the mid-band communication conforming to the 5G standard, and the selection terminal 114 is selected in the mid-band communication conforming to the 4G standard.

An input terminal of the input matching circuit 12 is electrically connected to the common terminal 111 of the fourth switch 11 and an output terminal of the input matching circuit 12 is electrically connected to an input terminal of the low noise amplifier 13. The input matching circuit 12 performs the impedance matching between the low noise amplifier 13 and the fourth switch 11.

The low noise amplifier 13 amplifies the reception signal. The output terminal of the low noise amplifier 13 is electrically connected to the signal output terminal 217. Specifically, the low noise amplifier 13 is electrically connected to the signal processing circuit 600 via the signal output terminal 217.

The controller 20 controls the multiple power amplifiers 9. The controller 20 are connected to the multiple power amplifiers 9. The controller 20 is connected to the signal processing circuit 600, for example, via the control terminal 216. The controller 20 controls each power amplifier 9 based on a control signal acquired from the signal processing circuit 600. The controller 20 conforms to, for example, Mobile Industry Processor Interface (MIPI) standard. The controller 20 controls each power amplifier 9 in accordance with the control signal from an RF signal processing circuit 602 in the signal processing circuit 600.

(3) Structure of Radio-Frequency Module

The structure of the radio-frequency module 1 will now be described with reference to FIG. 2A, FIG. 2B, and FIG. 3.

The radio-frequency module 1 includes multiple circuit components and a mounting substrate 200 on which the multiple circuit components are mounted. The multiple circuit components are components composing the circuit of the radio-frequency module 1.

The mounting substrate 200 has a first main surface 201 and a second main surface 202 that are opposed to each other in the thickness direction (hereinafter referred to as a first direction) D1 of the mounting substrate 200. The mounting substrate 200 is, for example, a printed wiring board, a low temperature co-fired ceramic (LTCC) substrate, a high temperature co-fired ceramic (HTCC) substrate, or a resin multilayer substrate. Here, the mounting substrate 200 is, for example, a multilayer substrate including multiple dielectric layers and multiple conductive layers. The multiple dielectric layers and the multiple conductive layers are laminated in the first direction D1 of the mounting substrate 200. The multiple conductive layers are formed in certain patterns defined for the respective layers. Each of the multiple conductive layers includes one or multiple conductor portions in one plane surface orthogonal to the first direction D1 of the mounting substrate 200. The material of the respective conductive layers is, for example, copper. The multiple conductive layers include a ground layer. In the radio-frequency module 1, one or more ground terminals 211 included in multiple external connection terminals 210 (refer to FIG. 2B and FIG. 3) and the ground layer are electrically connected to each other via conductors or the likes of the mounting substrate 200.

The mounting substrate 200 is not limited to the printed wiring board and the LTCC substrate and may be a wiring structure. The wiring structure is, for example, a multilayer structure. The multilayer structure includes at least one insulating layer and at least one conductive layer. The insulating layer is formed in a certain pattern. When the multiple insulating layers are provided, the multiple insulating layers are formed in certain patterns defined for the respective layers. The conductive layer is formed in a certain pattern different from the certain pattern of the insulating layer. When the multiple conductive layers are provided, the multiple conductive layers are formed in certain patterns defined for the respective layers. The conductive layer may include one or multiple re-wiring portions. In the wiring structure, among the two surfaces opposed to each other in the thickness direction of the multilayer structure, a first surface is the first main surface 201 of the mounting substrate 200 and a second surface is the second main surface 202 of the mounting substrate 200. The wiring structure may be, for example, an interposer. The interposer may be an interposer using a silicon substrate or may be a substrate composed of multiple layers.

The first main surface 201 and the second main surface 202 of the mounting substrate 200 are apart from each other in the first direction D1 of the mounting substrate 200 and are intersected with each other in the first direction D1 of the mounting substrate 200. Although the first main surface 201 of the mounting substrate 200 is, for example, orthogonal to the first direction D1 of the mounting substrate 200, the first main surface 201 of the mounting substrate 200 may include, for example, a side face or the like of the conductor portion as the surface that is not orthogonal to the first direction D1. Although the second main surface 202 of the mounting substrate 200 is, for example, orthogonal to the first direction D1 of the mounting substrate 200, the second main surface 202 of the mounting substrate 200 may include, for example, a side face or the like of the conductor portion as the surface that is not orthogonal to the first direction D1. Minute irregularities, recesses, or protrusions may be formed on the first main surface 201 and the second main surface 202 of the mounting substrate 200. Although the mounting substrate 200 has a substantially rectangular shape in a plan view of the mounting substrate 200 from the first direction D1, the mounting substrate 200 is not limited to a substantially rectangular shape and may have, for example, a substantially square shape.

The radio-frequency module 1 includes the multiple (two in the drawings) low pass filters 3A and 3B, the first switch 4, the multiple matching circuits 5, the multiple filters 6, the second switch 7, the multiple output matching circuits 8, the multiple power amplifiers 9, the multiple third switches 10, the fourth switch 11, the input matching circuit 12, the low noise amplifier 13, and the controller 20 as the multiple circuit components.

Each of the multiple circuit components of the radio-frequency module 1 is mounted on the first main surface 201 or the second main surface 202 of the mounting substrate 200. "Mounting the circuit components on the first main surface 201 (or the second main surface 202) of the mounting substrate 200" includes arrangement (mechanical connection) of the circuit components on the mounting substrate 200 and electrical connection of the circuit components to (an appropriate conductor portion of) the mounting substrate 200. Accordingly, each of the multiple circuit components is arranged on the first main surface 201 or the second main surface 202 of the mounting substrate 200 in the radio-frequency module 1. The multiple circuit components are not limited to electronic components mounted on the mounting substrate 200 and may include circuit elements provided in the mounting substrate 200.

In the radio-frequency module 1, the multiple power amplifiers 9 and the multiple output matching circuits 8 are mounted on the first main surface 201 of the mounting substrate 200. Accordingly, the multiple power amplifiers 9 and the multiple output matching circuits 8 are arranged on the first main surface 201 of the mounting substrate 200.

In the radio-frequency module 1, the multiple low pass filters 3A and 3B, the multiple matching circuits 5, the multiple filters 6, and the input matching circuit 12 are mounted on the first main surface 201 of the mounting substrate 200.

In the radio-frequency module 1, a one-chip integrated circuit (IC) chip 300 including the second switch 7, the multiple third switches 10, and the controller 20 is mounted on the second main surface 202. Accordingly, in the radio-frequency module 1, the second switch 7, the multiple third switches 10, and the controller 20 are arranged on the second main surface 202 of the mounting substrate 200.

In the radio-frequency module 1, a one-chip IC chip 310 including the first switch 4, the fourth switch 11, and the low noise amplifier 13 is mounted on the second main surface 202. Accordingly, in the radio-frequency module 1, the first switch 4, the fourth switch 11, and the low noise amplifier 13 are arranged on the second main surface 202 of the mounting substrate 200. The fourth switch 11 and the low noise amplifier 13 may be formed of one chip.

The circuit components composing the multiple output matching circuits 8 (the first output matching circuit 8a and the second output matching circuit 8b) include a transformer. In a plan view of the mounting substrate 200 from the first direction D1, the outer periphery of each output matching circuit 8 has a substantially rectangular shape. The circuit components composing the multiple output matching circuits 8 may include, for example, an inductor. When each output matching circuit 8 includes an inductor, the inductor included in each output matching circuit 8 is a surface-mount inductor mounted on the first main surface 201 of the mounting substrate 200. In the present embodiment, the first output matching circuit 8a and the second output matching circuit 8b are mounted on the first main surface 201 of the mounting substrate 200 along a second direction D2 intersecting with the first direction D1 (refer to FIG. 2A). The second direction D2 is orthogonal to the first direction D1 in the present embodiment.

The multiple power amplifiers 9 (the first power amplifier 9a and the second power amplifier 9b) are, for example, GaAs IC chips each having a power amplifier circuit including a heterojunction bipolar transistor (HBT) as a bipolar transistor. Each power amplifier 9 is flip-flop mounted on the mounting substrate 200. In a plan view of the mounting substrate 200 from the first direction D1, the outer periphery of each power amplifier 9 has a substantially rectangular shape. Each power amplifier 9 is not limited to the GaAs IC chip and may be a Si IC chip having a power amplifier circuit or a SiGe IC chip having a power amplifier circuit.

Figure 2B:
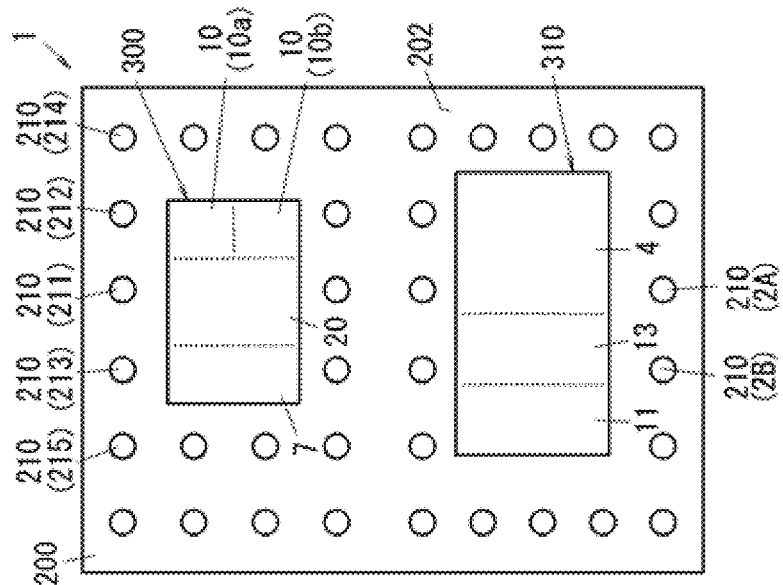
FIG. 2B is a bottom view for describing an example of the arrangement of the multiple circuit components on the substrate of the radio-frequency module in FIG. 1.
Figure 2A:
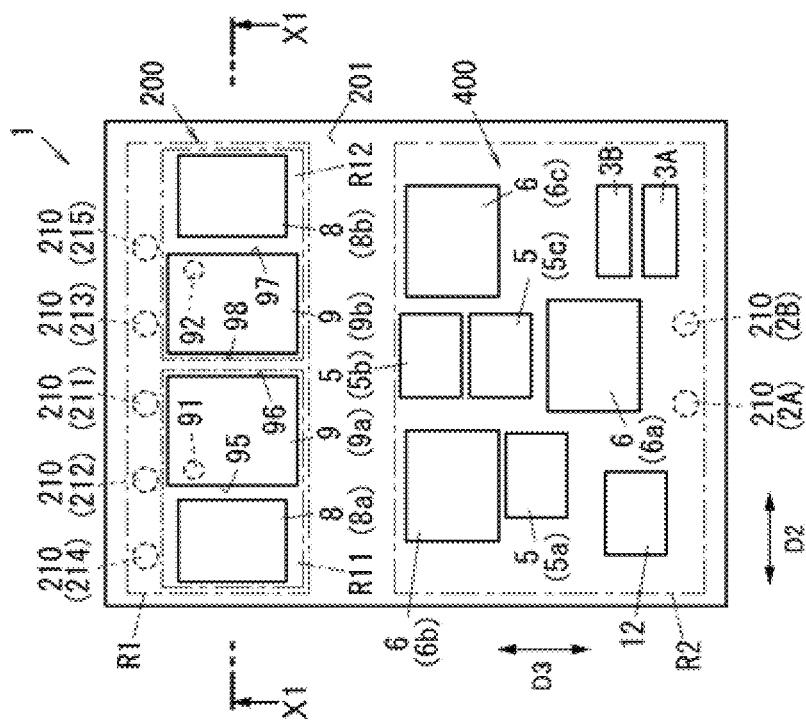
FIG. 2A is a plan view for describing an example of the arrangement of multiple circuit components on a substrate of the radio-frequency module in FIG. 1.

In the present embodiment, the first power amplifier 9a and the second power amplifier 9b are adjacent to each other along the second direction D2 and are mounted between the first output matching circuit 8a and the second output matching circuit 8b (refer to FIG. 2A). Specifically, the first power amplifier 9a and the second power amplifier 9b are mounted on the first main surface 201 of the mounting substrate 200 along the second direction D2. When the mounting substrate 200 is viewed from a third direction D3 intersecting with both the first direction D1 and the second direction D2, the first power amplifier 9a and the first output matching circuit 8a are mounted so as to be lined up with each other on the first main surface 201 of the mounting substrate 200 and the second power amplifier 9b and the second output matching circuit 8b are mounted so as to be lined up with each other on the first main surface 201 of the mounting substrate 200. When the mounting substrate 200 is viewed from the third direction D3, the first power amplifier 9a and the second power amplifier 9b are mounted on the first main surface 201 of the mounting substrate 200 between the first output matching circuit 8a and the second output matching circuit 8b. In the present embodiment, the third direction D3 is orthogonal to both the first direction D1 and the second direction D2.

In the present embodiment, the first power amplifier 9a and the second power amplifier 9b are mounted so that the centroid of the first power amplifier 9a coincides with the centroid of the second power amplifier 9b when the mounting substrate 200 is viewed from the second direction D2. In addition, the first output matching circuit 8a and the first power amplifier 9a are mounted on the first main surface 201 of the mounting substrate 200 so that the centroid of the first output matching circuit 8a coincides with the centroid of the first power amplifier 9a when the mounting substrate 200 is viewed from the second direction D2. The second output matching circuit 8b and the second power amplifier 9b are mounted on the first main surface 201 of the mounting substrate 200 so that the centroid of the second output matching circuit 8b coincides with the centroid of the second power amplifier 9b when the mounting substrate 200 is viewed from the second direction D2.

Mounting the first output matching circuit 8a, the second output matching circuit 8b, the first power amplifier 9a, and the second power amplifier 9b in the above manner makes the output direction of the transmission signal from the first power amplifier 9a to the first output matching circuit 8a opposite to the output direction of the transmission signal from the second power amplifier 9b to the second output matching circuit 8b. For example, the output direction of the transmission signal from the first power amplifier 9a to the first output matching circuit 8a may be a direction D21 and the output direction of the transmission signal from the second power amplifier 9b to the second output matching circuit 8b may be a direction D22.

The outer peripheries of the first power amplifier 9a and the second power amplifier 9b each have a substantially rectangular shape. The first power amplifier 9a has outer peripheral surfaces 95 and 96 along the third direction D3 (refer to FIG. 2A). The second power amplifier 9b has outer peripheral surfaces 97 and 98 along the third direction D3 (refer to FIG. 2A). The outer peripheral surface 96 of the first power amplifier 9a is adjacent to the outer peripheral surface 98 of the second power amplifier 9b.

The first output terminal 91 of the first power amplifier 9a is arranged at the first output matching circuit 8a side with respect to the outer peripheral surface 96. In the present embodiment, the first output terminal 91 of the first power amplifier 9a is arranged at the outer peripheral surface 95 side (refer to FIG. 2A). The second output terminal 92 of the second power amplifier 9b is arranged at the second output matching circuit 8b side with respect to the outer peripheral surface 98. In the present embodiment, the second output terminal 92 of the second power amplifier 9b is arranged at the outer peripheral surface 97 side (refer to FIG. 2A).

The first output terminal 91 may be arranged at the side of either of the two outer peripheral surfaces along the second direction D2 as the first output matching circuit 8a side. Similarly, the second output terminal 92 may be arranged at the side of either of the two outer peripheral surfaces along the second direction D2 as the second output matching circuit 8b side.

The circuit components composing the input matching circuit 12 include, for example, an inductor. In a plan view of the mounting substrate 200 from the first direction D1, the outer periphery of the input matching circuit 12 has a substantially rectangular shape.

The circuit components in each of the multiple matching circuits 5 include, for example, an inductor. The inductor included in each matching circuit 5 is, for example, a surface-mount inductor mounted on the first main surface 201 of the mounting substrate 200. In a plan view of the mounting substrate 200 from the first direction D1, the outer periphery of each matching circuit 5 has a substantially rectangular shape.

The IC chip 300 including the second switch 7, the multiple third switches 10, and the controller 20 is flip-flop mounted on the second main surface 202 of the mounting substrate 200. In a plan view of the mounting substrate 200 from the first direction D1, the outer periphery of the IC chip 300 has a substantially rectangular shape.

The IC chip 310 including the first switch 4, the fourth switch 11, and the low noise amplifier 13 is flip-flop mounted on the second main surface 202 of the mounting substrate 200. In a plan view of the mounting substrate 200 from the first direction D1, the outer periphery of the IC chip 310 has a substantially rectangular shape.

The first output matching circuit 8a, the second output matching circuit 8b, the first power amplifier 9a, and the second power amplifier 9b are mounted in a first area R1 on the first main surface 201 (refer to FIG. 2A). The multiple low pass filters 3A and 3B, the multiple matching circuits 5, the multiple filters 6, and the input matching circuit 12 are mounted in a second area R2 on the first main surface 201. The first area R1 and the second area R2 are mounted along the third direction D3. Specifically, a reception component group 400 including the third matching circuit 5c, the first reception filter 62, the second reception filter 64, the third reception filter 66, and the input matching circuit 12, which are used for reception of the reception signal, is mounted in the second area R2. In the present embodiment, the reception component group 400 includes the first filter 6a including the first reception filter 62, the second filter 6b including the second reception filter 64, and the third filter 6c including the third reception filter 66.

The first area R1 includes a high-band area R11 and a mid-band area R12. The high-band area R11 and the mid-band area R12 are provided along the second direction D2. The first output matching circuit 8a and the first power amplifier 9a are mounted in the high-band area R11. The second output matching circuit 8b and the second power amplifier 9b are mounted in the mid-band area R12.

The first power amplifier 9a and the reception component group 400 are mounted on the first main surface 201 of the mounting substrate 200 along the third direction D3. The second power amplifier 9b and the reception component group 400 are mounted on the first main surface 201 of the mounting substrate 200 along the third direction D3. In other words, the direction of the transmission signal supplied from the first power amplifier 9a to the first output matching circuit 8a is different from the mounting direction of the first power amplifier 9a and the reception component group 400. The direction of the transmission signal supplied from the second power amplifier 9b to the second output matching circuit 8b is different from the mounting direction of the second power amplifier 9b and the reception component group 400. For example, the direction of the transmission signal supplied from the first power amplifier 9a to the first output matching circuit 8a is the direction D21 and the mounting direction of the first power amplifier 9a and the reception component group 400 is the third direction D3. The direction of the transmission signal supplied from the second power amplifier 9b to the second output matching circuit 8b is the direction D22 and the mounting direction of the second power amplifier 9b and the reception component group 400 is the third direction D3.

Figure 3:
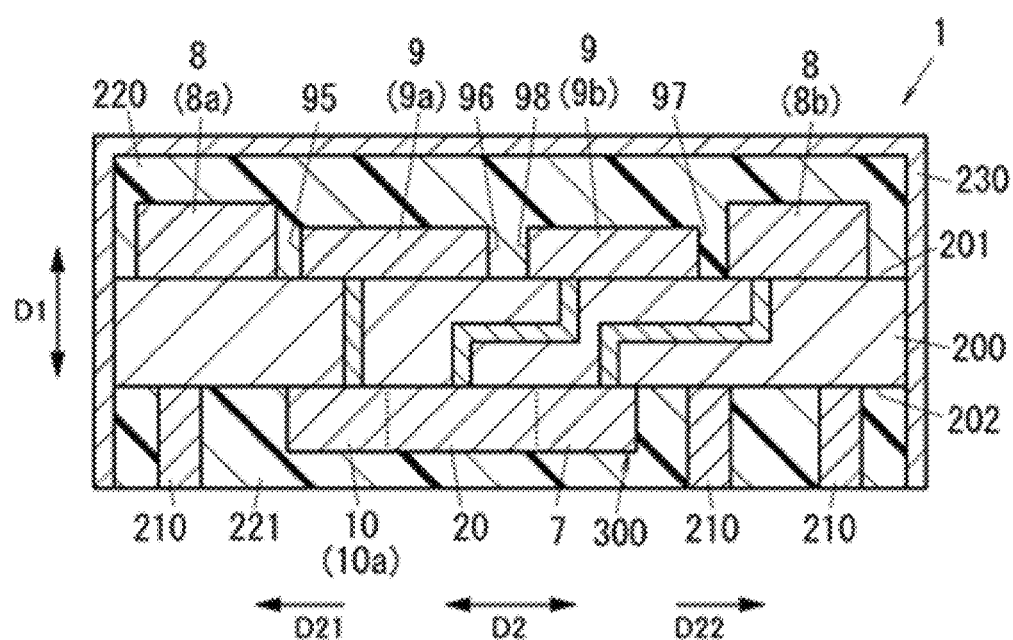
FIG. 3 is a cross-sectional view taken along the X1-X1 line in FIG. 2A of the radio-frequency module in FIG. 1.

The radio-frequency module 1 includes the multiple external connection terminals 210, as illustrated in FIG. 2B and FIG. 3. The multiple external connection terminals 210 are arranged on the second main surface 202 of the mounting substrate 200. The material of the multiple external connection terminal 210 is, for example, metal (for example, copper or copper alloy). Each of the multiple external connection terminals 210 is a substantially columnar electrode. Here, the substantially columnar electrode is, for example, a substantially cylindrical electrode. Although the multiple external connection terminals 210 have the same shape, the multiple external connection terminals 210 may have different shapes.

The multiple external connection terminals 210 include the antenna terminals 2A and 2B, the one or more ground terminals 211, the multiple first signal input terminals 212 and 214, the multiple second signal input terminals 213 and 215, the control terminal 216, and the signal output terminal 217. The one or more ground terminals 211 are electrically connected to the ground layer of the mounting substrate 200, as described above. The ground layer is the circuit ground of the radio-frequency module 1, and the circuit components of the radio-frequency module 1 include the circuit components electrically connected to the ground layer. Among the one or more ground terminals 211, at least one ground terminal 211 is arranged between the first signal input terminal 212 and the second signal input terminal 213 in the direction in which the first signal input terminal 212 is lined up with the second signal input terminal 213. In the present embodiment, one ground terminal 211 is arranged between the first signal input terminal 212 and the second signal input terminal 213 in the second direction D2. In other words, at least one ground terminal 211 is arranged between the first signal input terminal 212 and the second signal input terminal 213 in the direction in which the first signal input terminal 212 is lined up with the second signal input terminal 213 in a plan view of the mounting substrate 200 from the first direction D1.

The multiple first signal input terminals 212 and 214 and the multiple second signal input terminals 213 and 215 are arranged on the second main surface 202 of the mounting substrate 200 along the second direction D2 (refer to FIG. 2B). The antenna terminal 2A and the antenna terminal 2B are arranged on the second main surface 202 of the mounting substrate 200 so as to be adjacent to each other along the second direction D2 (refer to FIG. 2B).

The direction in which the multiple first signal input terminals 212 and 214 are lined up with the multiple second signal input terminals 213 and 215 is different from both the direction in which the multiple first signal input terminals 212 and 214 are lined up with the antenna terminals 2A and 2B and the direction in which the multiple second signal input terminals 213 and 215 are lined up with the antenna terminals 2A and 2B. Specifically, the direction in which the multiple first signal input terminals 212 and 214 are lined up with the multiple second signal input terminals 213 and 215 is the second direction D2. In contrast, the direction in which the multiple first signal input terminals 212 and 214 are lined up with the antenna terminals 2A and 2B and the direction in which the multiple second signal input terminals 213 and 215 are lined up with the antenna terminals 2A and 2B are the third direction D3.

In a plan view of the mounting substrate 200 from the first direction D1, the first power amplifier 9a, the second power amplifier 9b, the first output matching circuit 8a, and the second output matching circuit 8b are mounted on the first main surface 201 of the mounting substrate 200 between the multiple first signal input terminals 212 and 214 and the antenna terminals 2A and 2B and between the multiple second signal input terminals 213 and 215 and the antenna terminals 2A and 2B (refer to FIG. 2A).

The radio-frequency module 1 further includes a resin layer 220 (hereinafter also referred to as a first resin layer 220). The multiple circuit components arranged on the first main surface 201 of the mounting substrate 200 are covered with the first resin layer 220 at the first main surface 201 side of the mounting substrate 200. Here, the multiple circuit components arranged on the first main surface 201 of the mounting substrate 200 are sealed with the first resin layer 220. The first resin layer 220 contains resin. The first resin layer 220 may contain filler, in addition to the resin.

The radio-frequency module 1 according to the present embodiment further includes a resin layer 221 (hereinafter also referred to as a second resin layer 221). The second resin layer 221 is arranged on the second main surface 202 of the mounting substrate 200. Part of the multiple circuit components and part of the multiple external connection terminals 210, which are mounted on the second main surface 202 of the mounting substrate 200, are covered with the second resin layer 221 at the second main surface 202 side of the mounting substrate 200. The second resin layer 221 is formed so that the apical surface of each of the multiple external connection terminals 210 is exposed from the second resin layer 221. The second resin layer 221 contain resin. The second resin layer 221 may contain filler, in addition to the resin. The material of the second resin layer 221 may be the same as that of the first resin layer 220 or may be different from that of the first resin layer 220.

The radio-frequency module 1 further includes a shield layer 230. The material of the shield layer 230 is, for example, metal. The top face and the outer peripheral surface of the first resin layer 220, the outer peripheral surface of the mounting substrate 200, and the outer peripheral surface of the second resin layer 221 are covered with the shield layer 230. The shield layer 230 is in contact with the ground layer of the mounting substrate 200. Accordingly, the potential of the shield layer 230 is made equal to the potential of the ground layer in the radio-frequency module 1.

(4) Communication Apparatus

The communication apparatus 500 according to the present embodiment includes the radio-frequency module 1, the signal processing circuit 600, the multiple (two in the example in FIG. 1) antennas 610 and 611, as illustrated in FIG. 1. The signal processing circuit 600 performs signal processing of the signal passing through the radio-frequency module 1. The signal processing circuit 600 includes a baseband signal processing circuit 601 and the RF signal processing circuit 602.

The baseband signal processing circuit 601 is, for example, a baseband integrated circuit (BBIC), as illustrated in FIG. 1, and is electrically connected to the RF signal processing circuit 602. The baseband signal processing circuit 601 generates an I-phase signal and a Q-phase signal from a baseband signal. The baseband signal processing circuit 601 performs IQ modulation by combining the I-phase signal with the Q-phase signal and outputs the transmission signal. At this time, the transmission signal is generated as a modulation signal resulting from amplitude modulation of a carrier signal of a certain frequency with a period longer than the period of the carrier signal.

The RF signal processing circuit 602 is, for example, a radio-frequency integrated circuit (RFIC), as illustrated in FIG. 1, and is provided between the radio-frequency module 1 and the baseband signal processing circuit 601. The RF signal processing circuit 602 has a function to perform signal processing to the transmission signal from the baseband signal processing circuit 601 and a function to perform signal processing to the reception signals received by the antennas 610 and 611. The RF signal processing circuit 602 is a multiband processing circuit and is capable of generating and amplifying the transmission signals of multiple communication bands.

The baseband signal processing circuit 601 is not an essential component in the communication apparatus 500.

(5) Advantages

As described above, the radio-frequency module 1 according to the present embodiment includes the mounting substrate 200 having the first main surface (for example, the first main surface 201), the first power amplifier 9a, the second power amplifier 9b, the first output matching circuit 8a, and the second output matching circuit 8b. The first power amplifier 9a is mounted on the first main surface and amplifies the first transmission signal in the first frequency band. The second power amplifier 9b is mounted on the first main surface and amplifies the second transmission signal, which is capable of being simultaneously communicated with the first transmission signal and which is in the second frequency band different from the first frequency band. The first output matching circuit 8a is mounted on the first main surface and receives the first transmission signal amplified by the first power amplifier 9a. The second output matching circuit 8b is mounted on the first main surface and receives the second transmission signal amplified by the second power amplifier 9b. The first output matching circuit 8a and the second output matching circuit 8b are mounted along the second direction D2 intersecting with the thickness direction of the mounting substrate 200, which is the first direction D1. When the mounting substrate 200 is viewed from the third direction D3 intersecting with both the first direction D1 and the second direction D2, the first power amplifier 9a and the first output matching circuit 8a are mounted so as to be lined up with each other and the second power amplifier 9b and the second output matching circuit 8b are mounted so as to be lined up with each other. When the mounting substrate 200 is viewed from the third direction D3, the first power amplifier 9a and the second power amplifier 9b are mounted between the first output matching circuit 8a and the second output matching circuit 8b.

With the above configuration, the direction in which the first transmission signal supplied from the first power amplifier 9a to the first output matching circuit 8a is output is made different from the direction in which the second transmission signal supplied from the second power amplifier 9b to the second output matching circuit 8b is output. As a result, it is possible to suppress reduction in isolation when the signals (the first transmission signal and the second transmission signal) in different frequency bands are transmitted through the simultaneous communication.

(6) Modifications

Modifications of the embodiment will now be described.

(6.1) First Modification

The configuration is described in the above embodiment, in which the first power amplifier 9a, the second power amplifier 9b, the first output matching circuit 8a, and the second output matching circuit 8b are mounted on the first main surface 201 of the mounting substrate 200 so that the respective centroids coincide with each other when the mounting substrate 200 is viewed from the second direction D2. However, the radio-frequency module 1 is not limited to this configuration.

The first power amplifier 9a and the second power amplifier 9b may be mounted on the first main surface 201 of the mounting substrate 200 so that the centroid of the first power amplifier 9a does not coincide with the centroid of the second power amplifier 9b when the mounting substrate 200 is viewed from the second direction D2 (refer to FIG. 4A). In a first modification, the first power amplifier 9a and the second power amplifier 9b are mounted on the first main surface 201 of the mounting substrate 200 so that the centroid of the first power amplifier 9a is at the side opposite to the second area R2 with respect to the centroid of the second power amplifier 9b. The first output matching circuit 8a and the first power amplifier 9a are mounted on the first main surface 201 of the mounting substrate 200 so that the centroid of the first output matching circuit 8a coincides with the centroid of the first power amplifier 9a when the mounting substrate 200 is viewed from the second direction D2. The second output matching circuit 8b and the second power amplifier 9b are mounted on the first main surface 201 of the mounting substrate 200 so that the centroid of the second output matching circuit 8b coincides with the centroid of the second power amplifier 9b when the mounting substrate 200 is viewed from the second direction D2. Also in the first modification, the first power amplifier 9a and the second power amplifier 9b are mounted between the first output matching circuit 8a and the second output matching circuit 8b when the mounting substrate 200 is viewed from the third direction D3, as in the embodiment.

In the first modification, the first output terminal 91 of the first power amplifier 9a is arranged at the first output matching circuit 8a side with respect to the outer peripheral surface 96 and the second output terminal 92 of the second power amplifier 9b is arranged at the second output matching circuit 8b side with respect to the outer peripheral surface 98, as in the embodiment.

The first power amplifier 9a and the second power amplifier 9b may be mounted on the first main surface 201 of the mounting substrate 200 so that the centroid of the first power amplifier 9a is at the second area R2 side with respect to the centroid of the second power amplifier 9b.

(6.2) Second Modification

When the mounting substrate 200 is viewed from the second direction D2, the first power amplifier 9a, the second power amplifier 9b, the first output matching circuit 8a, and the second output matching circuit 8b may be mounted on the first main surface 201 of the mounting substrate 200 so that the respective centroids do not coincide with each other. Also in a second modification, the first power amplifier 9a and the second power amplifier 9b are mounted between the first output matching circuit 8a and the second output matching circuit 8b when the mounting substrate 200 is viewed from the third direction D3, as in the embodiment.

For example, as illustrated in FIG. 4B, the first power amplifier 9a and the second power amplifier 9b are mounted on the first main surface 201 of the mounting substrate 200 so that the centroid of the first power amplifier 9a does not coincide with the centroid of the second power amplifier 9b when mounting substrate 200 is viewed from the second direction D2. In addition, the first output matching circuit 8a, the first power amplifier 9a, and the second power amplifier 9b are mounted on the first main surface 201 of the mounting substrate 200 so that the respective centroids do not coincide with each other when mounting substrate 200 is viewed from the second direction D2. The second output matching circuit 8b, the first power amplifier 9a, and the second power amplifier 9b are mounted on the first main surface 201 of the mounting substrate 200 so that the respective centroids do not coincide with each other when mounting substrate 200 is viewed from the second direction D2.

In the second modification, the first power amplifier 9a and the second power amplifier 9b are mounted on the first main surface 201 of the mounting substrate 200 so that the centroid of the first power amplifier 9a is at the second area R2 side with respect to the centroid of the second power amplifier 9b. The first power amplifier 9a and the first output matching circuit 8a are mounted on the first main surface 201 of the mounting substrate 200 so that the centroid of the first power amplifier 9a is at the side opposite to the second area R2 with respect to the centroid of the first output matching circuit 8a. The second power amplifier 9b and the second output matching circuit 8b are mounted on the first main surface 201 of the mounting substrate 200 so that the centroid of the second power amplifier 9b is at the second area R2 side with respect to the centroid of the second output matching circuit 8b.

In the second modification, the first output terminal 91 of the first power amplifier 9a is arranged at the first output matching circuit 8a side with respect to the outer peripheral surface 96 and the second output terminal 92 of the second power amplifier 9b is arranged at the second output matching circuit 8b side with respect to the outer peripheral surface 98, as in the embodiment.

The first power amplifier 9a and the second power amplifier 9b may be mounted on the first main surface 201 of the mounting substrate 200 so that the centroid of the first power amplifier 9a is at the side opposite to the second area R2 with respect to the centroid of the second power amplifier 9b. The first power amplifier 9a and the first output matching circuit 8a may be mounted on the first main surface 201 of the mounting substrate 200 so that the centroid of the first power amplifier 9a is at the second area R2 side with respect to the centroid of the first output matching circuit 8a. The second power amplifier 9b and the second output matching circuit 8b may be mounted on the first main surface 201 of the mounting substrate 200 so that the centroid of the second power amplifier 9b is at the side opposite to the second area R2 with respect to the centroid of the second output matching circuit 8b.

(6.3) Third Modification

The first power amplifier 9a and the first output matching circuit 8a may be mounted on the first main surface 201 of the mounting substrate 200 so that the respective centroids do not coincide with each other when the mounting substrate 200 is viewed from the second direction D2. In addition, the second power amplifier 9b and the second output matching circuit 8b may be mounted on the first main surface 201 of the mounting substrate 200 so that the respective centroids do not coincide with each other when mounting substrate 200 is viewed from the second direction D2. The first power amplifier 9a and the second power amplifier 9b are mounted on the first main surface 201 of the mounting substrate 200 so that the respective centroids coincide with each other when the mounting substrate 200 is viewed from the second direction D2. Also in a third modification, the first power amplifier 9a and the second power amplifier 9b are mounted between the first output matching circuit 8a and the second output matching circuit 8b when the mounting substrate 200 is viewed from the third direction D3, as in the embodiment.

Figure 5A:
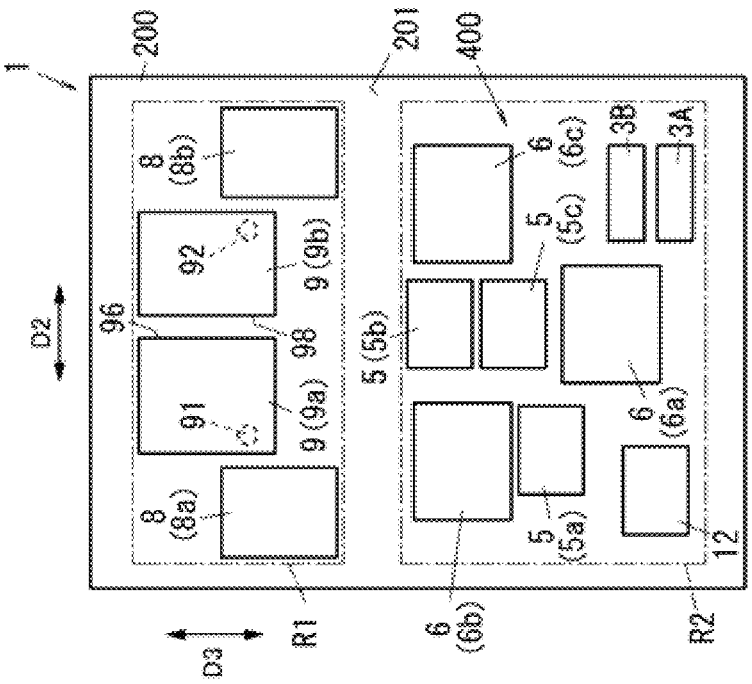
FIG. 5A is a plan view for describing an example of the arrangement of multiple circuit components on a substrate of a radio-frequency module according to a third modification of the embodiment.

In the third modification, as illustrated in FIG. 5A, the first power amplifier 9a and the first output matching circuit 8a are mounted on the first main surface 201 of the mounting substrate 200 so that the centroid of the first power amplifier 9a is at the second area R2 side with respect to the centroid of the first output matching circuit 8a. In addition, as illustrated in FIG. 5A, the second power amplifier 9b and the second output matching circuit 8b are mounted on the first main surface 201 of the mounting substrate 200 so that the centroid of the second power amplifier 9b is at the second area R2 side with respect to the centroid of the second output matching circuit 8b.

In the third modification, the first output terminal 91 of the first power amplifier 9a is arranged at the first output matching circuit 8a side with respect to the outer peripheral surface 96 and the second output terminal 92 of the second power amplifier 9b is arranged at the second output matching circuit 8b side with respect to the outer peripheral surface 98, as in the embodiment.

(6.4) Fourth Modification

Figure 5B:
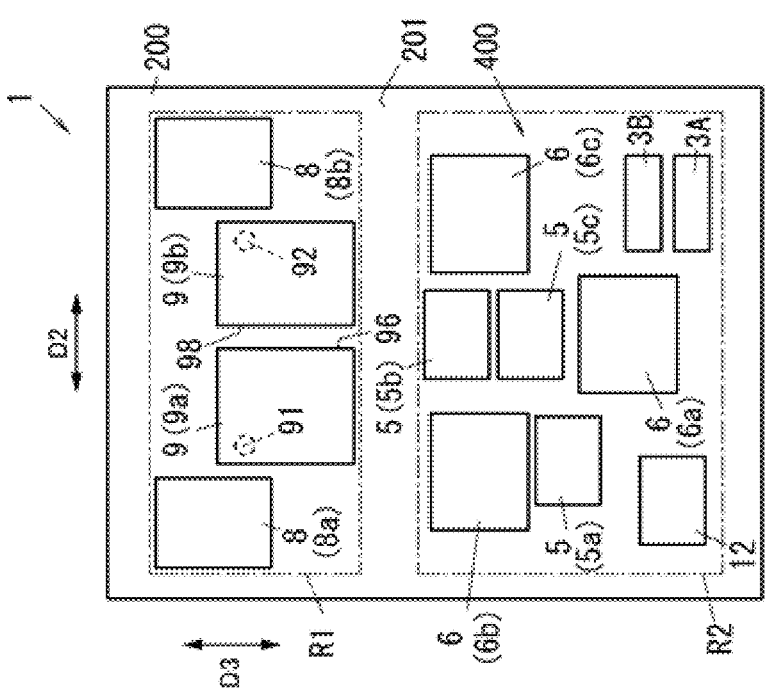
FIG. 5B is a plan view for describing an example of the arrangement of multiple circuit components on a substrate of a radio-frequency module according to a fourth modification of the embodiment.

As a modification of the third modification, the first power amplifier 9a and the first output matching circuit 8a may be mounted on the first main surface 201 of the mounting substrate 200 so that the centroid of the first power amplifier 9a is at the side opposite to the second area R2 with respect to the centroid of the first output matching circuit 8a (refer to FIG. 5B). In addition, the second power amplifier 9b and the second output matching circuit 8b may be mounted on the first main surface 201 of the mounting substrate 200 so that the centroid of the second power amplifier 9b is at the side opposite to the second area R2 with respect to the centroid of the second output matching circuit 8b (refer to FIG. 5B).

In a fourth modification, the first output terminal 91 of the first power amplifier 9a is arranged at the first output matching circuit 8a side with respect to the outer peripheral surface 96 and the second output terminal 92 of the second power amplifier 9b is arranged at the second output matching circuit 8b side with respect to the outer peripheral surface 98, as in the third modification.

Alternatively, the first power amplifier 9a, the second power amplifier 9b, the first output matching circuit 8a, and the second output matching circuit 8b may be mounted on the first main surface 201 of the mounting substrate 200 so that the centroid of the first power amplifier 9a is at the side opposite to the second area R2 with respect to the centroid of the first output matching circuit 8a and so that the centroid of the second power amplifier 9b is at the second area R2 side with respect to the centroid of the second output matching circuit 8b.

Alternatively, the first power amplifier 9a, the second power amplifier 9b, the first output matching circuit 8a, and the second output matching circuit 8b may be mounted on the first main surface 201 of the mounting substrate 200 so that the centroid of the first power amplifier 9a is at the second area R2 side with respect to the centroid of the first output matching circuit 8a and so that the centroid of the second power amplifier 9b is at the side opposite to the second area R2 with respect to the centroid of the second output matching circuit 8b.

(6.5) Fifth Modification

When the mounting substrate 200 is viewed from the third direction D3, the first power amplifier 9a and the second power amplifier 9b may be mounted on the first main surface 201 of the mounting substrate 200 so that the centroid of the first power amplifier 9a coincides with the centroid of the second power amplifier 9b. Also in a fifth modification, the first power amplifier 9a and the second power amplifier 9b are mounted between the first output matching circuit 8a and the second output matching circuit 8b when the mounting substrate 200 is viewed from the third direction D3, as in the embodiment.

Figure 6A:
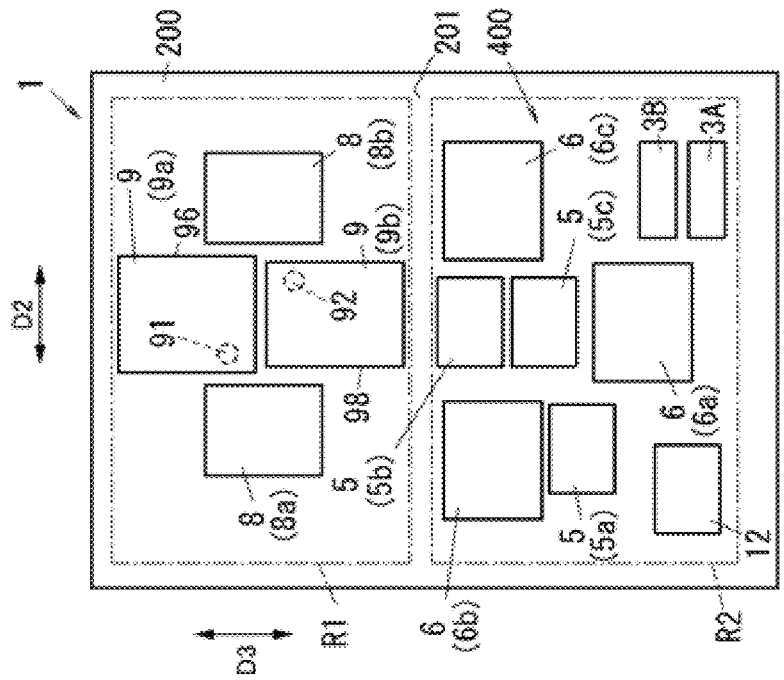
FIG. 6A is a plan view for describing an example of the arrangement of multiple circuit components on a substrate of a radio-frequency module according to a fifth modification of the embodiment.

In the fifth modification, as illustrated in FIG. 6A, the first power amplifier 9a and the second power amplifier 9b are mounted on the first main surface 201 of the mounting substrate 200 so that the centroid of the first power amplifier 9a is at the side opposite to the second area R2 with respect to the centroid of the second power amplifier 9b. The first output matching circuit 8a is mounted on the first main surface 201 of the mounting substrate 200 so that the centroid of the first output matching circuit 8a coincides with the centroid of the first power amplifier 9a when the mounting substrate 200 is viewed from the second direction D2 (refer to FIG. 6A). The second output matching circuit 8b is mounted on the first main surface 201 of the mounting substrate 200 so that the centroid of the second output matching circuit 8b coincides with the centroid of the second power amplifier 9b when the mounting substrate 200 is viewed from the second direction D2 (refer to FIG. 6A).

In the fifth modification, the first output terminal 91 of the first power amplifier 9a is arranged at the first output matching circuit 8*a* side with respect to the outer peripheral surface 96 and the second output terminal 92 of the second power amplifier 9*b* is arranged at the second output matching circuit 8*b* side with respect to the outer peripheral surface 98, as in the embodiment.

In the fifth modification, the first power amplifier 9*a* and the second power amplifier 9*b* may be mounted on the first main surface 201 of the mounting substrate 200 so that the respective centroids do not coincide with each other when the mounting substrate 200 is viewed from the third direction D3.

(6.6) Sixth Modification

Figure 6B:
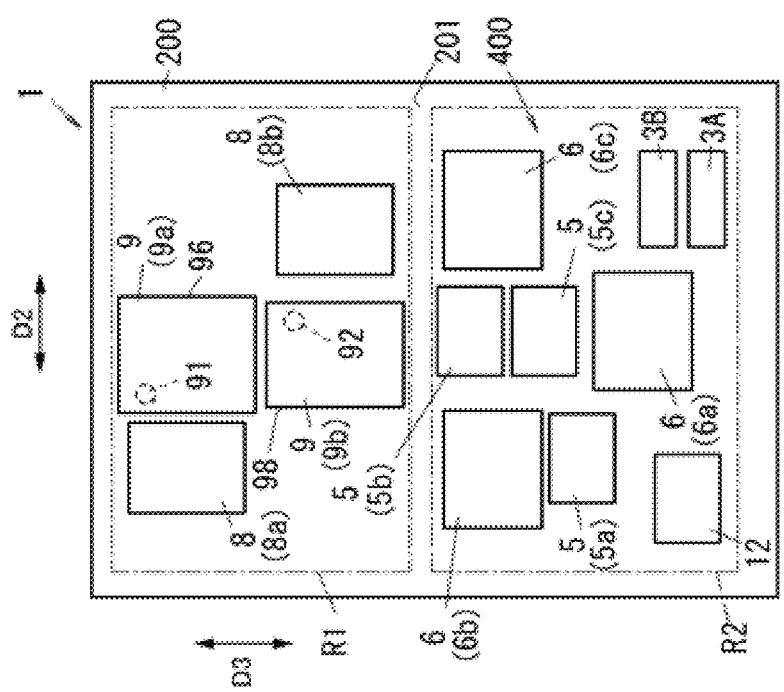
FIG. 6B is a plan view for describing an example of the arrangement of multiple circuit components on a substrate of a radio-frequency module according to a sixth modification of the embodiment.

As a modification of the fifth modification, the first output matching circuit 8*a* may be mounted on the first main surface 201 of the mounting substrate 200 so that the centroid of the first output matching circuit 8*a* does not coincide with the centroid of the first power amplifier 9*a* when the mounting substrate 200 is viewed from the second direction D2 (refer to FIG. 6B). The second output matching circuit 8*b* may be mounted on the first main surface 201 of the mounting substrate 200 so that the centroid of the second output matching circuit 8*b* does not coincide with the centroid of the second power amplifier 9*b* when the mounting substrate 200 is viewed from the second direction D2 (refer to FIG. 6B).

For example, in FIG. 6B, the first power amplifier 9*a* and the first output matching circuit 8*a* are mounted on the first main surface 201 of the mounting substrate 200 so that the centroid of the first power amplifier 9*a* is at the side opposite to the second area R2 with respect to the centroid of the first output matching circuit 8*a*. The second power amplifier 9*b* and the second output matching circuit 8*b* are mounted on the first main surface 201 of the mounting substrate 200 so that the centroid of the second power amplifier 9*b* is at the second area R2 side with respect to the centroid of the second output matching circuit 8*b*. The first power amplifier 9*a* and the first output matching circuit 8*a* may be mounted on the first main surface 201 of the mounting substrate 200 so that the centroid of the first power amplifier 9*a* is at the second area R2 side with respect to the centroid of the first output matching circuit 8*a*. The second power amplifier 9*b* and the second output matching circuit 8*b* may be mounted on the first main surface 201 of the mounting substrate 200 so that the centroid of the second power amplifier 9*b* is at the side opposite to the second area R2 with respect to the centroid of the second output matching circuit 8*b*.

In a sixth modification, the first output terminal 91 of the first power amplifier 9*a* is arranged at the first output matching circuit 8*a* side with respect to the outer peripheral surface 96 and the second output terminal 92 of the second power amplifier 9*b* is arranged at the second output matching circuit 8*b* side with respect to the outer peripheral surface 98, as in the fifth modification.

In the sixth modification, the first power amplifier 9*a* and the second power amplifier 9*b* may be mounted on the first main surface 201 of the mounting substrate 200 so that the respective centroids do not coincide with each other when the mounting substrate 200 is viewed from the third direction D3.

When the mounting substrate 200 is viewed from the second direction D2, the first power amplifier 9*a*, the second power amplifier 9*b*, the first output matching circuit 8*a*, and the second output matching circuit 8*b* may be mounted on the first main surface 201 of the mounting substrate 200 so that the centroid of the first power amplifier 9*a* coincides with the centroid of the first output matching circuit 8*a* and so that the centroid of the second power amplifier 9*b* does not coincide with the centroid of the second output matching circuit 8*b*. Alternatively, when the mounting substrate 200 is viewed from the second direction D2, the first power amplifier 9*a*, the second power amplifier 9*b*, the first output matching circuit 8*a*, and the second output matching circuit 8*b* may be mounted on the first main surface 201 of the mounting substrate 200 so that the centroid of the first power amplifier 9*a* does not coincide with the centroid of the first output matching circuit 8*a* and so that the centroid of the second power amplifier 9*b* coincides with the centroid of the second output matching circuit 8*b*.

(6.7) Seventh Modification

The configuration is described in the embodiment, in which the first power amplifier 9*a*, the second power amplifier 9*b*, and the IC chip 300 are arranged (mounted) on the mounting substrate 200 so that the first power amplifier 9*a* and the second power amplifier 9*b* are overlapped with the IC chip 300 when the mounting substrate 200 is viewed from the first direction D1. However, the configuration of the radio-frequency module 1 is not limited to this configuration.

Figure 7:
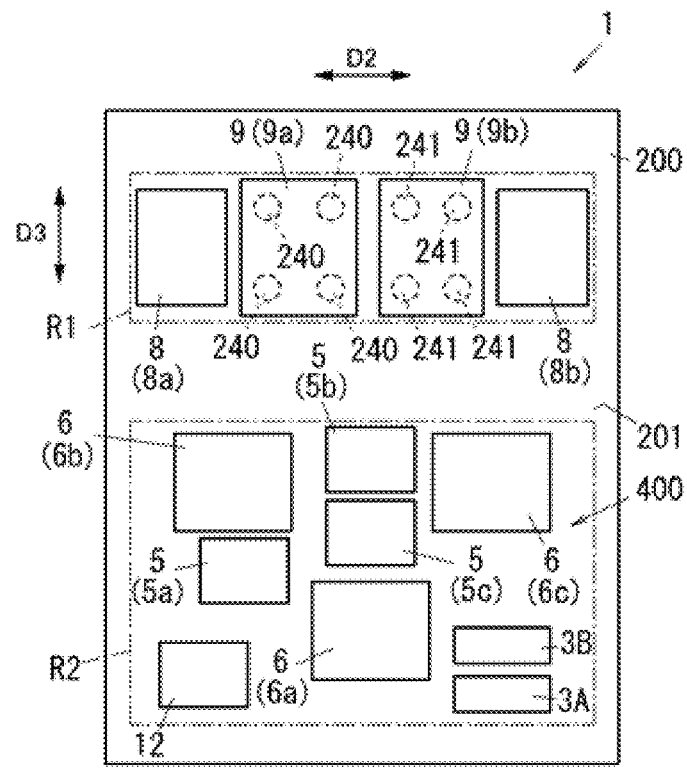
FIG. 7 is a plan view for describing a radio-frequency module according to a seventh modification of the embodiment.

For example, as illustrated in FIG. 7, the radio-frequency module 1 may further include multiple (four in the example in FIG. 7) first heat radiation vias (first thermal vias) 240 that are arranged in the mounting substrate 200 so as to be overlapped with the first power amplifier 9*a* in a plan view of the mounting substrate 200 from the first direction D1. Similarly, the radio-frequency module 1 may further include multiple (four in the example in FIG. 7) second heat radiation vias (second thermal vias) 241 that are arranged in the mounting substrate 200 so as to be overlapped with the second power amplifier 9*b* in a plan view of the mounting substrate 200 from the first direction D1.

In a seventh modification, the IC chip 300 is arranged (mounted) on the second main surface 202 so as not to be overlapped with the first power amplifier 9*a* and the second power amplifier 9*b* in a plan view of the mounting substrate 200 from the first direction D1.

With the above configuration, providing the multiple first heat radiation vias 240 immediately below the first power amplifier 9*a* and providing the multiple second heat radiation vias 241 immediately below the second power amplifier 9*b* enable the effect of heat applied to other circuits and so on to be reduced.

(6.8) Eighth Modification

Figure 8:
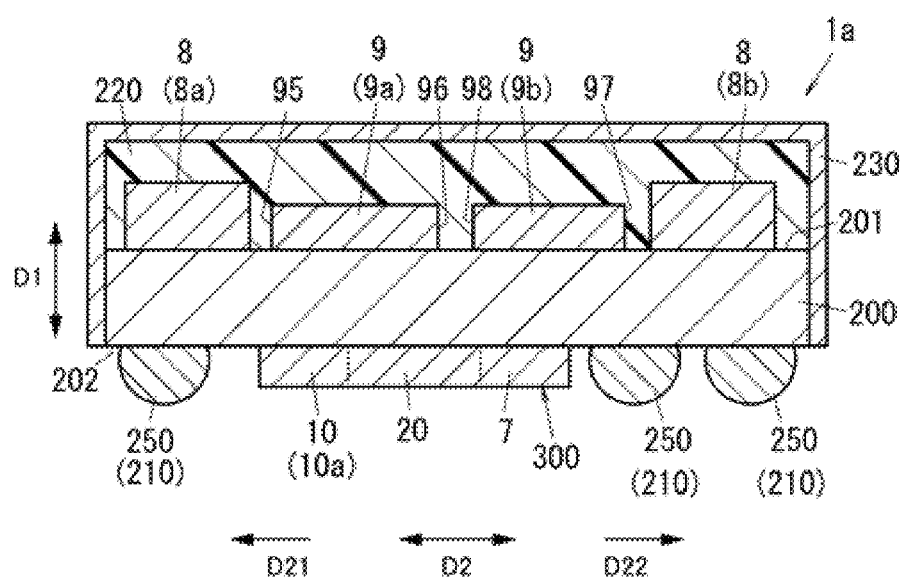
FIG. 8 is a cross-sectional view of a radio-frequency module according to an eighth modification of the embodiment.

A radio-frequency module 1*a* according to an eighth modification of the embodiment will now be described with reference to FIG. 8. The same reference numerals are used in the radio-frequency module 1*a* according to the eighth modification to identify the same components as in the radio-frequency module 1 according to the embodiment and a description of such components is omitted herein.

The radio-frequency module 1*a* according to the eighth modification differs from the radio-frequency module 1 according to the embodiment in that the multiple external connection terminals 210 are ball bumps 250. In addition, the radio-frequency module 1*a* according to the eighth modification differs from the radio-frequency module 1 according to the embodiment in that the radio-frequency module 1*a* does not include the second resin layer 221 of the radio-frequency module 1 according to the embodiment. The radio-frequency module 1*a* according to the eighth modification may include an underfill portion provided in a gap between the IC chips 300 and 310 and the second main surface 202 of the mounting substrate 200.

The material of the ball bump 250 composing each of the multiple external connection terminals 210 is, for example, gold, copper, or solder.

The external connection terminals 210 composed of the ball bumps 250 and the external connection terminals 210 composed of the substantially columnar electrodes may be mixed in the multiple external connection terminals 210.

In the radio-frequency module 1a according to the eighth modification, it is possible to reduce the profile in the first direction D1 of the mounting substrate 200.

(6.9) Ninth Modification

Although the radio-frequency module 1 is configured so as to perform the simultaneous communication using the two antennas 610 and 611 in the embodiment, the radio-frequency module 1 is not limited to this configuration. The radio-frequency module 1 may be configured so as to perform the simultaneous communication using one antenna.

(6.10) Tenth Modification

Although the radio-frequency module 1 has the configuration in the embodiment, in which the multiple circuit components are arranged (mounted) on both the first main surface 201 and the second main surface 202 of the mounting substrate 200, the radio-frequency module 1 is not limited to this configuration. The multiple circuit components may be arranged (mounted) only on the first main surface 201 of the mounting substrate 200. In this case, only the multiple external connection terminals 210 are arranged (mounted) on the second main surface 202.

Review

As described above, the radio-frequency module (1, 1a) of a first aspect includes the mounting substrate (200) having the first main surface (for example, the first main surface 201), the first power amplifier (9a), the second power amplifier (9b), the first output matching circuit (8a), and the second output matching circuit (8b). The first power amplifier (9a) is mounted on the first main surface and amplifies the first transmission signal in the first frequency band. The second power amplifier (9b) is mounted on the first main surface and amplifies the second transmission signal, which is capable of being simultaneously communicated with the first transmission signal and which is in the second frequency band different from the first frequency band. The first output matching circuit (8a) is mounted on the first main surface and receives the first transmission signal amplified by the first power amplifier (9a). The second output matching circuit (8b) is mounted on the first main surface and receives the second transmission signal amplified by the second power amplifier (9b). The first output matching circuit (8a) and the second output matching circuit (8b) are mounted along the second direction (D2) intersecting with the thickness direction of the mounting substrate (200), which is the first direction (D1). When the mounting substrate (200) is viewed from the third direction (D3) intersecting with both the first direction (D1) and the second direction (D2), the first power amplifier (9a) and the first output matching circuit (8a) are mounted so as to be lined up with each other and the second power amplifier (9b) and the second output matching circuit (8b) are mounted so as to be lined up with each other. When the mounting substrate (200) is viewed from the third direction (D3), the first power amplifier (9a) and the second power amplifier (9b) are mounted between the first output matching circuit (8a) and the second output matching circuit (8b).

With the above configuration, the direction in which the first transmission signal supplied from the first power amplifier (9a) to the first output matching circuit (8a) is output is made different from the direction in which the second transmission signal supplied from the second power amplifier (9b) to the second output matching circuit (8b) is output. As a result, it is possible to suppress reduction in isolation when the signals (the first transmission signal and the second transmission signal) in different frequency bands are transmitted through the simultaneous communication.

In the radio-frequency module (1, 1a) of a second aspect, in the first aspect, the first power amplifier (9a) has the first output terminal (91) through which the first transmission signal is output. The second power amplifier (9b) has the second output terminal (92) through which the second transmission signal is output. At least one output terminal, among the first output terminal (91) and the second output terminal (92), is mounted at the output matching circuit side to which the corresponding transmission signal is output, among the first output matching circuit (8a) and the second output matching circuit (8b).

With the above configuration, it is possible to reliably make the direction in which the first transmission signal supplied from the first power amplifier (9a) to the first output matching circuit (8a) is output different from the direction in which the second transmission signal supplied from the second power amplifier (9b) to the second output matching circuit (8b) is output.

In the radio-frequency module (1, 1a) of a third aspect, in the second aspect, the first output terminal (91) is mounted at the first output matching circuit (8a) side in the first power amplifier (9a). The second output terminal (92) is mounted at the second output matching circuit (8b) side in the second power amplifier (9b).

With the above configuration, it is possible to reliably make the direction in which the first transmission signal supplied from the first power amplifier (9a) to the first output matching circuit (8a) is output different from the direction in which the second transmission signal supplied from the second power amplifier (9b) to the second output matching circuit (8b) is output.

The radio-frequency module (1, 1a) of a fourth aspect further includes the reception component group (400) in any of the first to third aspects. The reception component group (400) is mounted on the first main surface of the mounting substrate (200) and includes the reception filter (for example, the first reception filter 62, the second reception filter 64, and the third reception filter 66) through which the reception signal is transmitted. The direction of the first transmission signal supplied from the first power amplifier (9a) to the first output matching circuit (8a) is different from the mounting direction of the first power amplifier (9a) and the reception component group (400). The direction of the second transmission signal supplied from the second power amplifier (9b) to the second output matching circuit (8b) is different from the mounting direction of the second power amplifier (9b) and the reception component group (400).

With the above configuration, the direction (the output direction) of the first transmission signal from the first power amplifier (9a) and the direction (the output direction) of the second transmission signal from the second power amplifier (9b) are different from the mounting directions of the first power amplifier (9a) and the second power amplifier (9b) and the reception component group (400). Accordingly, the jump of the first transmission signal and the second transmission signal to the reception circuit is relieved. As a result, it is possible to suppress the reduction in isolation in transmission and reception.

In the radio-frequency module (1, 1a) of a fifth aspect, in any of the first to fourth aspects, the direction (for example, the direction D21) of the first transmission signal supplied from the first power amplifier (9a) to the first output matching circuit (8a) is opposite to the direction (for example, the direction D22) of the second transmission signal supplied from the second power amplifier (9b) to the second output matching circuit (8b).

With the above configuration, it is possible to suppress the reduction in isolation when the signals (the first transmission signal and the second transmission signal) in different frequency bands are transmitted through the simultaneous communication.

The radio-frequency module (1, 1a) of a sixth aspect further includes the antenna terminal (the antenna terminals 2A and 2B), the first signal input terminal (for example, the first signal input terminals 212 and 214), and the second signal input terminal (for example, the second signal input terminals 213 and 215) in any of the first to fifth aspects. The first signal input terminal is mounted on the mounting substrate (200) and the first transmission signal is input into the first signal input terminal. The second signal input terminal is mounted on the mounting substrate (200) and the second transmission signal is input into the second signal input terminal. The direction in which the first signal input terminal is lined up with the second signal input terminal is different from the direction in which the first signal input terminal is lined up with the antenna terminal and the direction in which the second signal input terminal is lined up with the antenna terminal.

With the above configuration, the first signal input terminal and the second signal input terminal are capable of being arranged at positions apart from the position of the antenna terminal. It is possible to suppress the reduction in isolation when the signals (the first transmission signal and the second transmission signal) in different frequency bands are transmitted through the simultaneous communication.

In the radio-frequency module (1, 1a) of a seventh aspect, in the sixth aspect, in a plan view of the mounting substrate (200) from the first direction (D1), the first power amplifier (9a), the second power amplifier (9b), the first output matching circuit (8a), and the second output matching circuit (8b) are mounted between the first signal input terminal and the antenna terminal and between the second signal input terminal and the antenna terminal.

With the above configuration, it is possible to reliably arrange the first signal input terminal and the second signal input terminal at positions apart from the position of the antenna terminal.

The radio-frequency module (1, 1a) of an eighth aspect further includes the first heat radiation via (240) and the second heat radiation via (241) in the seventh aspect. The first heat radiation via (240) is arranged in the mounting substrate (200) so as to be overlapped with the first power amplifier (9a) in a plan view of the mounting substrate (200) from the first direction (D1). The second heat radiation via (241) is arranged in the mounting substrate (200) so as to be overlapped with the second power amplifier (9b) in a plan view of the mounting substrate (200) from the first direction (D1).

With the above configuration, it is possible to decrease the temperatures of the first power amplifier (9a) and the second power amplifier (9b).

The radio-frequency module (1, 1a) of a ninth aspect further includes at least one ground terminal (211) in any of the sixth to eighth aspects. The at least one ground terminal (211) is arranged between the first signal input terminal and the second signal input terminal in the direction in which the first signal input terminal is lined up with the second signal input terminal in a plan view of the mounting substrate (200) from the first direction (D1).

With the above configuration, it is possible to suppress the reduction in isolation when the signals (the first transmission signal and the second transmission signal) in different frequency bands are transmitted through the simultaneous communication.

The communication apparatus (500) of a tenth aspect includes the radio-frequency module (1, 1a) of any of the first to ninth aspects and the signal processing circuit (600) that processes the first transmission signal and the second transmission signal passing through the radio-frequency module (1, 1a).

With the above configuration, it is possible to suppress the reduction in isolation when the signals (the first transmission signal and the second transmission signal) in different frequency bands are transmitted through the simultaneous communication.

While embodiments have been described above, it is to be understood that variations and modifications will be apparent to those skilled in the art without departing from the scope and spirit of the disclosure.

What is claimed is:

1. A radio-frequency module, comprising:
    a mounting substrate having a first main surface, a thickness of the mounting substrate along a first direction;
    a first power amplifier that is mounted on the first main surface and that amplifies a first transmission signal in a first frequency band, the first power amplifier including a first output terminal through which the first transmission signal is output;
    a second power amplifier that is mounted on the first main surface and that amplifies a second transmission signal in a second frequency band different from the first frequency band, the second power amplifier including a second output terminal through which the second transmission signal is output;
    a first output matching circuit that is mounted on the first main surface and that receives the first transmission signal amplified by the first power amplifier; and
    a second output matching circuit that is mounted on the first main surface and that receives the second transmission signal amplified by the second power amplifier,
    wherein
    the first output matching circuit and the second output matching circuit are mounted along a second direction intersecting with the first direction,
    at least one output terminal, among the first output terminal and the second output terminal, is mounted on a output matching circuit side to which the corresponding transmission signal is output,
    when the mounting substrate is viewed from a third direction intersecting both the first direction and the second direction, the first power amplifier and the first output matching circuit line up with each other and the second power amplifier and the second output matching circuit line up with each other, and
    when the mounting substrate is viewed from the third direction, the first power amplifier and the second power amplifier are between the first output matching circuit and the second output matching circuit.

2. The radio-frequency module according to claim 1, wherein
    the first output terminal is mounted on a first output matching circuit side in the first power amplifier, and the second output terminal is mounted on a second output matching circuit side in the second power amplifier.

3. The radio-frequency module according to claim 1, further comprising:
a reception component group, that is mounted on the first main surface of the mounting substrate, that includes a reception filter through which a reception signal is transmitted, wherein
a direction of the first transmission signal supplied from the first power amplifier to the first output matching circuit is different from a mounting direction of the first power amplifier and the reception component group, and
a direction of the second transmission signal supplied from the second power amplifier to the second output matching circuit is different from a mounting direction of the second power amplifier and the reception component group.

4. The radio-frequency module according to claim 1, wherein a direction of the first transmission signal supplied from the first power amplifier to the first output matching circuit is opposite to a direction of the second transmission signal supplied from the second power amplifier to the second output matching circuit.

5. The radio-frequency module according to claim 1, further comprising:
an antenna terminal;
a first signal input terminal that is mounted on the mounting substrate and into which the first transmission signal is input; and
a second signal input terminal that is mounted on the mounting substrate and into which the second transmission signal is input, wherein
a direction in which the first signal input terminal is lined up with the second signal input terminal is different from a direction in which the first signal input terminal is lined up with the antenna terminal and a direction in which the second signal input terminal is lined up with the antenna terminal.

6. The radio-frequency module according to claim 5, wherein in a plan view of the mounting substrate from the first direction, the first power amplifier, the second power amplifier, the first output matching circuit, and the second output matching circuit are mounted between the first signal input terminal and the antenna terminal and between the second signal input terminal and the antenna terminal.

7. The radio-frequency module according to claim 6, further comprising:
a first heat radiation via that is arranged in the mounting substrate so as to be overlapped with the first power amplifier in the plan view of the mounting substrate from the first direction; and
a second heat radiation via that is arranged in the mounting substrate so as to be overlapped with the second power amplifier in the plan view of the mounting substrate from the first direction.

8. The radio-frequency module according to claim 5, further comprising:
at least one ground terminal that is arranged between the first signal input terminal and the second signal input terminal in the direction in which the first signal input terminal is lined up with the second signal input terminal in a plan view of the mounting substrate from the first direction.

9. A communication apparatus, comprising:
the radio-frequency module according to claim 1; and a signal processing circuit that processes the first transmission signal and the second transmission signal passing through the radio-frequency module.

10. The radio-frequency module according to claim 1, wherein the first transmission signal and the second transmission signal are simultaneously communicated by the radio-frequency module.

11. A radio-frequency module, comprising:
a mounting substrate having a first main surface, a thickness of the mounting substrate along a first direction;
a first power amplifier that is mounted on the first main surface and that amplifies a first transmission signal in a first frequency band;
a second power amplifier that is mounted on the first main surface and that amplifies a second transmission signal in a second frequency band different from the first frequency band;
a first output matching circuit that is mounted on the first main surface and that receives the first transmission signal amplified by the first power amplifier;
a second output matching circuit that is mounted on the first main surface and that receives the second transmission signal amplified by the second power amplifier; and
a reception component group, that is mounted on the first main surface of the mounting substrate, the reception component group including a reception filter through which a reception signal is transmitted, wherein
the first output matching circuit and the second output matching circuit are mounted along a second direction intersecting with the first direction,
when the mounting substrate is viewed from a third direction intersecting both the first direction and the second direction, the first power amplifier and the first output matching circuit line up with each other and the second power amplifier and the second output matching circuit line up with each other,
when the mounting substrate is viewed from the third direction, the first power amplifier and the second power amplifier are between the first output matching circuit and the second output matching circuit,
a direction of the first transmission signal supplied from the first power amplifier to the first output matching circuit is different from a mounting direction of the first power amplifier and the reception component group, and
a direction of the second transmission signal supplied from the second power amplifier to the second output matching circuit is different from a mounting direction of the second power amplifier and the reception component group.

12. The radio-frequency module according to claim 11, wherein
the first output terminal is mounted on a first output matching circuit side in the first power amplifier, and
the second output terminal is mounted on a second output matching circuit side in the second power amplifier.

13. The radio-frequency module according to claim 11, wherein a direction of the first transmission signal supplied from the first power amplifier to the first output matching circuit is opposite to a direction of the second transmission signal supplied from the second power amplifier to the second output matching circuit.

14. The radio-frequency module according to claim 11, further comprising:
an antenna terminal;

a first signal input terminal that is mounted on the mounting substrate and into which the first transmission signal is input; and a second signal input terminal that is mounted on the mounting substrate and into which the second transmission signal is input, wherein a direction in which the first signal input terminal is lined up with the second signal input terminal is different from a direction in which the first signal input terminal is lined up with the antenna terminal and a direction in which the second signal input terminal is lined up with the antenna terminal.

15. The radio-frequency module according to claim 14, wherein in a plan view of the mounting substrate from the first direction, the first power amplifier, the second power amplifier, the first output matching circuit, and the second output matching circuit are mounted between the first signal input terminal and the antenna terminal and between the second signal input terminal and the antenna terminal.

16. The radio-frequency module according to claim 15, further comprising:
    a first heat radiation via that is arranged in the mounting substrate so as to be overlapped with the first power amplifier in the plan view of the mounting substrate from the first direction; and
    a second heat radiation via that is arranged in the mounting substrate so as to be overlapped with the second power amplifier in the plan view of the mounting substrate from the first direction.

17. The radio-frequency module according to claim 16, further comprising:
    at least one ground terminal that is arranged between the first signal input terminal and the second signal input terminal in the direction in which the first signal input terminal is lined up with the second signal input terminal in a plan view of the mounting substrate from the first direction.

18. A communication apparatus, comprising:
    the radio-frequency module according to claim 11; and
    a signal processing circuit that processes the first transmission signal and the second transmission signal passing through the radio-frequency module.

19. The radio-frequency module according to claim 11, wherein the first transmission signal and the second transmission signal are simultaneously communicated by the radio-frequency module.

20. A radio-frequency module, comprising:
an antenna terminal;
a mounting substrate having a first main surface, a thickness of the mounting substrate along a first direction;
a first power amplifier that is mounted on the first main surface and that amplifies a first transmission signal in a first frequency band;
a second power amplifier that is mounted on the first main surface and that amplifies a second transmission signal in a second frequency band different from the first frequency band;
a first signal input terminal that is mounted on the mounting substrate and into which the first transmission signal is input;
a second signal input terminal that is mounted on the mounting substrate and into which the second transmission signal is input;
a first output matching circuit that is mounted on the first main surface and that receives the first transmission signal amplified by the first power amplifier; and
a second output matching circuit that is mounted on the first main surface and that receives the second transmission signal amplified by the second power amplifier, wherein the first output matching circuit and the second output matching circuit are mounted along a second direction intersecting with the first direction,
when the mounting substrate is viewed from a third direction intersecting both the first direction and the second direction, the first power amplifier and the first output matching circuit line up with each other and the second power amplifier and the second output matching circuit line up with each other,
when the mounting substrate is viewed from the third direction, the first power amplifier and the second power amplifier are between the first output matching circuit and the second output matching circuit, and
a direction in which the first signal input terminal is lined up with the second signal input terminal is different from a direction in which the first signal input terminal is lined up with the antenna terminal and a direction in which the second signal input terminal is lined up with the antenna terminal.

* * * * *